United States Patent
Singhal et al.

(10) Patent No.: US 12,361,933 B1
(45) Date of Patent: Jul. 15, 2025

(54) QUALITY ASSURANCE SYSTEMS BASED ON SPEAKER INTENT DETECTION

(71) Applicant: Ujwal Inc., Mountain View, CA (US)

(72) Inventors: Madhur Singhal, New Delhi (IN); Ashish Nagar, Los Altos, CA (US); Tanul Singh, Gorakhpur (IN); Abhimanyu Talwar, Mississauga (CA); Sumeet Khullar, Santa Clara, CA (US)

(73) Assignee: Ujwal Inc., Mountain View, CA (US)

( * ) Notice: Subject to any disclaimer, the term of this patent is extended or adjusted under 35 U.S.C. 154(b) by 0 days.

(21) Appl. No.: 19/169,785

(22) Filed: Apr. 3, 2025

Related U.S. Application Data

(63) Continuation of application No. PCT/US2024/013558, filed on Jan. 30, 2024.

(60) Provisional application No. 63/597,343, filed on Nov. 9, 2023, provisional application No. 63/521,105, filed on Jun. 15, 2023, provisional application No. 63/442,159, filed on Jan. 31, 2023.

(51) Int. Cl.
 *G10L 15/18* (2013.01)
 *G10L 15/16* (2006.01)

(52) U.S. Cl.
 CPC .......... *G10L 15/1815* (2013.01); *G10L 15/16* (2013.01)

(58) Field of Classification Search
 CPC .................... G10L 15/1815; G10L 15/16
 See application file for complete search history.

(56) References Cited

U.S. PATENT DOCUMENTS

| | | | |
|---|---|---|---|
| 12,001,804 B2* | 6/2024 | Galitsky | G06F 40/253 |
| 12,175,968 B1* | 12/2024 | AbdelHady | G10L 15/1815 |
| 12,204,866 B1* | 1/2025 | Atluri | G06F 40/35 |
| 12,205,577 B1* | 1/2025 | Kim | G06T 13/80 |

(Continued)

FOREIGN PATENT DOCUMENTS

CN 115545832 A 12/2022

OTHER PUBLICATIONS

Song et al., "MPNet: Masked and Permuted Pre-training for Language Understanding", Nanjing University of Science and Technology, Nov. 2, 2020, 14 pages.

(Continued)

*Primary Examiner* — Fariba Sirjani
(74) *Attorney, Agent, or Firm* — American Patent Agency PC; Daniar Hussain; Stephen M. Hou

(57) ABSTRACT

A semantic similarity based configurable system for automatic scenario detection in customer-agent conversations is disclosed. The system understands intent from the vector space semantic similarity between speaker sentences, which is agnostic to the use of synonyms and tolerates a large amount of paraphrasing. This approach scales easily to a large number of customers and can be fed more data to increase accuracy and precision. Furthermore, the system is configurable in real-time so that the client is able to control which intents are detected and how. In some embodiments, the semantic similarity based configurable system comprises a scenario detection system, a conversation tag system, a bi-encoder, and a cross-encoder, where the scenario detection system receives inputs of sample phrases and customer-agent utterances and generates results. The sample phrases may be phrases and keywords that describe a scenario expressing the behavior of a customer or call agent.

19 Claims, 19 Drawing Sheets

(56) References Cited

U.S. PATENT DOCUMENTS

| | | | |
|---|---|---|---|
| 12,205,589 B1* | 1/2025 | Pemberton | G10L 15/22 |
| 12,231,380 B1* | 2/2025 | Rodgers | H04L 51/02 |
| 2017/0242886 A1* | 8/2017 | Jolley | G06F 40/211 |
| 2020/0195779 A1* | 6/2020 | Weisman | G06N 5/01 |
| 2021/0104234 A1* | 4/2021 | Zhang | G06F 40/30 |
| 2022/0139384 A1* | 5/2022 | Wu | G06F 40/35 |
| | | | 704/257 |
| 2023/0004716 A1* | 1/2023 | He | G06F 16/9558 |
| 2024/0256581 A1* | 8/2024 | Jiang | G06F 16/3329 |

OTHER PUBLICATIONS

International Search Report and Written Opinion of PCT Application No. PCT/US2024/013558, mailed on Jun. 21, 2024.
International Preliminary Report on Patentability of PCT Application No. PCT/US2024/013558, mailed on Mar. 4, 2025.

* cited by examiner

FIG. 15

QUALITY ASSURANCE SYSTEMS BASED ON SPEAKER INTENT DETECTION

REFERENCE TO RELATED APPLICATIONS

If an Application Data Sheet (ADS) or PCT Request Form ("Request") has been filed on the filing date of this application, it is incorporated by reference herein. Any applications claimed on the ADS or Request for priority under 35 U.S.C. §§ 119, 120, 121, or 365 (c), and any and all parent, grandparent, great-grandparent, etc. applications of such applications, are also incorporated by reference, including any priority claims made in those applications and any material incorporated by reference, to the extent such subject matter is not inconsistent herewith.

Furthermore, this application is related to the U.S. patent applications listed below from which priority is claimed, which are incorporated by reference in their entireties herein, as if fully set forth herein:

- U.S. provisional patent application No. 63/442,159, filed on 31 Jan. 2023, entitled "Configurable Intent Phrase Based Quality Assurance Systems," describing semantic similarity-based configurable systems for automatic scenario detection in customer-agent conversations.
- U.S. provisional patent application No. 63/521,105, filed on 15 Jun. 2023, entitled "Customer Agent Screen Recording Systems and Methods," describing methods for triggered recording and analysis of customer-agent interactions using a customer relationship management (CRM) system.
- U.S. provisional patent application No. 63/597,343, filed on 9 Nov. 2023, entitled "Transformer-Based Assistant for Identifying, Organizing, and Responding to Customer Concerns," describing transformer-based agent assistant systems that serve as machine learning-based customer service tools that analyze past customer-agent conversations to build knowledge bases of problem-resolution steps.

Notice of Copyrights and Tradedress

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

This disclosure relates to machine learning, and in particular, to a system of recognizing semantics and identifying intent in a conversation.

BACKGROUND OF THE INVENTION

The statements in the background of the invention are provided to assist with understanding the invention and its applications and uses, and may not constitute prior art.

As companies grow in terms of employees, products, and complexity, it is vital that they maintain positive customer-company relationships. A typical situation involves a customer reaching out to a company's customer service hotline. The customer is then redirected to a call agent, where the agent assists the customer regarding his or her questions or concerns. Some ways to ensure a satisfactory customer experience include properly training the call agent and keeping track of the frequency of certain complaints in order to minimize future occurrences. However, current methods that address quality assurance (QA) and gain insight of the conversation involve monitoring calls and having systems implement algorithms that use exact keyword matching. For example, to detect customer frustration, one would look for the presence of keywords in the client's call such as "hate" or "angry." The shortcomings of such an approach are that it may not detect certain scenarios, such as a customer using a synonym that is not in a pre-set keyword list (e.g., "I am exasperated" may be a phrase absent from the list), or a customer expressing an idea in an implicit manner (e.g., "It's January already, and I see no signs of my salary"). Thus, the intent of a customer's complaint would be underreported and potentially left unaddressed. Another issue with keyword-based systems is that the system must keep lists of synonyms in a database and continuously check during a customer-call agent conversation whether such words are uttered. When companies are receiving hundreds of calls per day, such a system is inefficient and is not scalable, as one cannot exhaustively check for all synonyms. Thus, this approach will always be limited by the size and diversity of the keyword lists.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

Accordingly, in view of the background, it would be an advancement in the state of the art to develop a scalable, high-precision system that identifies the intent of a speaker (a call center agent or their customer) given a spoken utterance from that speaker based on the semantics of the customer-call agent conversation. Such a system may be implemented by understanding intent from the vector space semantic similarity between speaker sentences, which is agnostic to the use of synonyms and tolerates a large amount of paraphrasing. This approach scales easily to a large number of customers and can be fed more data to increase accuracy and precision. Furthermore, it would be a further advancement in the state of the art to develop a system that is configurable in real-time such that the company is able to control which intents are detected and how the intents are detected.

Therefore, a semantic similarity based configurable system for automatic scenario detection in customer-agent conversations is disclosed. The system understands intent from the vector space semantic similarity between speaker sentences, which is agnostic to the use of synonyms and tolerates a large amount of paraphrasing. This approach scales easily to a large number of customers and can be fed more data to increase accuracy and precision. Furthermore, the system is configurable in real-time so that the client is able to control which intents are detected and how. In some embodiments, the semantic similarity based configurable system comprises a scenario detection system, a conversation tag system, a bi-encoder, and a cross-encoder, where the scenario detection system receives inputs of sample phrases and customer-agent utterances and generates results. The sample phrases may be phrases and keywords that describe a scenario expressing the behavior of a customer or call agent.

Accordingly, various methods, processes, systems, and non-transitory storage medium storing program code for executing processes for the determination of a best-matched scenario name label for an utterance during automatic scenario detection in customer-agent conversations are provided. In one embodiment, a non-transitory physical storage medium storing program code is provided. The program code is executable by a hardware processor. The hardware processor when executing the program code causes the hardware processor to execute a computer-implemented process for the determination of a best-matched scenario name label for an utterance during automatic scenario detection in customer-agent conversations. The program code comprises code to receive by a retrieve stage, the retrieve stage comprising a bi-encoder neural network, a plurality of scenarios, a plurality of scenario name labels, and a plurality of lists of sample phrases, where each scenario in the plurality of scenarios is associated with a scenario name label in the plurality of scenario name labels and with a list of sample phrases in the plurality of lists of sample phrases; encode by the retrieve stage each sample phrase in the plurality of lists of sample phrases into a phrase encoding to generate a plurality of lists of phrase encodings; generate by the retrieve stage a plurality of scenario encodings, where each scenario encoding in the plurality of scenario encodings is associated with a scenario in the plurality of scenarios, is associated with a scenario name label in the plurality of scenario name labels, and is associated with a list of phrase encodings in the plurality of lists of phrase encodings, and where each scenario encoding in the plurality of scenario encodings is based on normalizing and determining a centroid of a list of phrase encodings associated with the scenario in the plurality of scenarios; store the plurality of scenario encodings, the plurality of scenario name labels, and the plurality of lists of phrase encodings into a database; receive by the retrieve stage the utterance; encode by the retrieve stage a conversation context vector of the utterance; generate by the retrieve stage a plurality of similarity scores for the conversation context vector of the utterance, where each similarity score in the plurality of similarity scores is associated with a scenario encoding in the plurality of scenario encodings stored in the database; determine by the retrieve stage a best-matched scenario encoding from among the plurality of scenario encodings by selecting a scenario encoding in the plurality of scenarios with a highest similarity score among the plurality of similarity scores; generate by the retrieve stage a plurality of ordered pairs, where a first component of each ordered pair in the plurality of ordered pairs is the utterance and a second component of each ordered pair in the plurality of ordered pairs is a phrase encoding from a list of phrase encodings associated with the best-matched scenario encoding; generate by a rerank stage, the rerank stage comprising a cross-encoder neural network, a plurality of probabilities of similarity, where each probability of similarity in the plurality of probabilities of similarity is associated with an ordered pair in the plurality of ordered pairs; determine by the rerank stage whether at least one probability of similarity in the plurality of probabilities of similarity exceeds a preset threshold; assign by the rerank stage the best-matched scenario name label from among the plurality of scenario name labels associated with the best-matched scenario encoding to the utterance if at least one probability of similarity in the plurality of probabilities of similarity exceeds a preset threshold; and assign by the rerank stage an intentless scenario name label to the utterance if no probability of similarity in the plurality of probabilities of similarity exceeds the preset threshold.

In one embodiment, the bi-encoder neural network comprises a Masked and Permuted Pre-training for Language Understanding (MPNet)-based model, a plurality of encoder stacks, and a multilayer perceptron (MLP).

In one embodiment, the cross-encoder neural network comprises a large language model (LLM) based on a Bidirectional Encoder Representations from Transformers (BERT) language model, a plurality of encoder stacks, and a multilayer perceptron (MLP).

In one embodiment, encoding a sample phrase comprises generating a vector of real numbers.

In one embodiment, the plurality of similarity scores is a plurality of cosine similarity scores.

In one embodiment, the program code further comprises code to trigger a conversation tag based on the best-matched scenario name label and a plurality of configured options, where a conversation tag comprises a text string.

In one embodiment, the plurality of configured options comprises a speaker identity, where the program code to trigger the conversation tag is further based on an identity of a speaker of the utterance.

In one embodiment, the program code to trigger the conversation tag is further based on whether a sequence of an agent sentence is followed by a customer sentence.

In one embodiment, the plurality of configured options comprises speaker behavior, where the program code to trigger the conversation tag is further based on whether a speaker of the utterance mentioned a particular phrase.

In one embodiment, the plurality of configured options comprises timing, where the program code to trigger the conversation tag is further based on whether the utterance occurred within a preset period of time after a conversation has begun.

In another embodiment, a non-transitory physical storage medium storing program code is provided. The program code is executable by a hardware processor. The hardware processor when executing the program code causes the hardware processor to execute a computer-implemented process for the determination of a best-matched scenario name label for an utterance during automatic scenario detection in customer-agent conversations. The program code comprises code to receive by a retrieve stage the utterance, the retrieve stage comprising a bi-encoder neural network; encode by the retrieve stage a conversation context vector of the utterance; generate by the retrieve stage a plurality of similarity scores for the conversation context vector of the utterance, where each similarity score in the plurality of similarity scores is associated with a scenario encoding in a plurality of scenario encodings, is associated with a scenario name label in a plurality of scenario name labels, and is associated with a list of phrase encodings in a plurality of lists of phrase encodings; determine by the retrieve stage a best-matched scenario encoding from among the plurality of scenario encodings by selecting a scenario encoding in the plurality of scenario encodings with a highest similarity score among the plurality of similarity scores; generate by the retrieve stage a plurality of ordered pairs, where a first component of each ordered pair in the plurality of ordered pairs is the utterance and a second component of each ordered pair in the plurality of ordered pairs is a phrase encoding from a list of phrase encodings associated with the best-matched scenario encoding; generate by a rerank stage, the rerank stage comprising a cross-encoder neural network, a plurality of probabilities of similarity, where each probability of similarity in the plurality of probabilities of similarity is associated with an ordered pair in the plurality of ordered pairs; determine by the rerank stage whether at least one probability of similarity in the plurality of probabilities of similarity exceeds a preset threshold; assign by the rerank stage the best-matched scenario name label from among the plurality of scenario name labels associated with the best-matched scenario encoding to the utterance if at least one probability of similarity in the plurality of probabilities of similarity exceeds a preset threshold; and assign by the rerank stage an intentless scenario name label to the utterance if no probability of similarity in the plurality of probabilities of similarity exceeds the preset threshold.

In yet another embodiment, a computer-implemented method for the determination of a best-matched scenario name label for an utterance during automatic scenario detection in customer-agent conversations is provided. The method comprises receiving by a retrieve stage, the retrieve stage comprising a bi-encoder neural network, a plurality of scenarios, a plurality of scenario name labels, and a plurality of lists of sample phrases, where each scenario in the plurality of scenarios is associated with a scenario name label in the plurality of scenario name labels and with a list of sample phrases in the plurality of lists of sample phrases; encoding by the retrieve stage each sample phrase in the plurality of lists of sample phrases into a phrase encoding to generate a plurality of lists of phrase encodings; generating by the retrieve stage a plurality of scenario encodings, where each scenario encoding in the plurality of scenario encodings is associated with a scenario in the plurality of scenarios, is associated with a scenario name label in the plurality of scenario name labels, and is associated with a list of phrase encodings in the plurality of lists of phrase encodings, and where each scenario encoding in the plurality of scenario encodings is based on normalizing and determining a centroid of a list of phrase encodings associated with the scenario in the plurality of scenarios; storing the plurality of scenario encodings, the plurality of scenario name labels, and the plurality of lists of phrase encodings into a database; receiving by the retrieve stage the utterance; encoding by the retrieve stage a conversation context vector of the utterance; generating by the retrieve stage a plurality of similarity scores for the conversation context vector of the utterance, where each similarity score in the plurality of similarity scores is associated with a scenario encoding in the plurality of scenario encodings stored in the database; determining by the retrieve stage a best-matched scenario encoding from among the plurality of scenario encodings by selecting a scenario encoding in the plurality of scenarios with a highest similarity score among the plurality of similarity scores; generating by the retrieve stage a plurality of ordered pairs, where a first component of each ordered pair in the plurality of ordered pairs is the utterance and a second component of each ordered pair in the plurality of ordered pairs is a phrase encoding from a list of phrase encodings associated with the best-matched scenario encoding; generating by a rerank stage, the rerank stage comprising a cross-encoder neural network, a plurality of probabilities of similarity, where each probability of similarity in the plurality of probabilities of similarity is associated with an ordered pair in the plurality of ordered pairs; determining by the rerank stage whether at least one probability of similarity in the plurality of probabilities of similarity exceed a preset threshold; assigning by the rerank stage the best-matched scenario name label from among the plurality of scenario name labels associated with the best-matched scenario encoding to the utterance if at least one probability of similarity in the plurality of probabilities of similarity exceeds a preset threshold; and assigning by the rerank stage an intentless scenario name label to the utterance if no probability of similarity in the plurality of probabilities of similarity exceeds the preset threshold.

In one embodiment, the bi-encoder neural network comprises a Masked and Permuted Pre-training for Language Understanding (MPNet)-based model, a plurality of encoder stacks, and a multilayer perceptron (MLP).

In one embodiment, the cross-encoder neural network comprises a large language Roberta-base model (LLM) based on a Bidirectional Encoder Representations from Transformers (BERT) language model, a plurality of encoder stacks, and a multilayer perceptron (MLP).

In one embodiment, encoding a sample phrase comprises generating a vector of real numbers.

In one embodiment, the plurality of similarity scores is a plurality of cosine similarity scores.

In one embodiment, the method further comprises triggering a conversation tag based on the best-matched scenario name label and a plurality of configured options, where a conversation tag comprises a text string.

In one embodiment, the plurality of configured options comprises a speaker identity, where the triggering the conversation tag is further based on an identity of a speaker of the utterance and on whether a sequence of an agent sentence is followed by a customer sentence.

In one embodiment, the plurality of configured options comprises speaker behavior, where the triggering the conversation tag is further based on whether a speaker of the utterance mentioned a particular phrase.

In one embodiment, the plurality of configured options comprises timing, where the triggering the conversation tag is further based on whether the utterance occurred within a preset period of time after a conversation has begun.

In various embodiments, a computer program product is disclosed. The computer program may be used for the determination of a best-matched scenario name label for an utterance during automatic scenario detection in customer-agent conversations, and may include a computer-readable storage medium having program instructions, or program code, embodied therewith, the program instructions executable by a processor to cause the processor to perform steps to the aforementioned steps.

In various embodiments, a system is described, including a memory that stores computer-executable components, and a hardware processor, operably coupled to the memory, and that executes the computer-executable components stored in the memory, wherein the computer-executable components may include components communicatively coupled with the processor that execute the aforementioned steps.

In another embodiment, the present invention is a non-transitory, computer-readable storage medium storing executable instructions, which when executed by a processor, causes the processor to perform a process for doing something, the instructions causing the processor to perform the aforementioned steps.

In another embodiment, the present invention is a system for configurable intent phrase based quality assurance systems, as shown and described herein, the system comprising a user device having a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the aforementioned steps.

In yet another embodiment, the present invention is a computerized server comprising at least one processor, memory, and a plurality of computer codes embodied on said memory, said plurality of computer codes which when executed causes said processor to execute a process comprising the aforementioned steps. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings. Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with the non-transitory physical storage medium may have corresponding features definable and/or combinable with respect to a system and/or method and/or system, or vice versa, and these embodiments are specifically envisaged.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which:

FIG. 15 shows a fourth example graphical user interface (GUI) as it relates to a scenario detection and conversation tag system, according to exemplary embodiments of the present invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

As used herein, the singular forms "a," "an," and "the" include plural references unless the context clearly indicates otherwise. Thus, for example, reference to "a fiber" includes a single fiber as well as a mixture of two or more different fibers, and the like. Also as used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number +/−10%, such that "about 10" would include from 9 to 11.

Scenario Detection System & Conversation Tag System

In the descriptions that follow, a "client" denotes the owner or operator of the system, such as an organization providing a service or a product, a "customer" denotes a caller (e.g., a service or product user), and an "agent" denotes a responder (e.g., a customer service representative, an account manager, etc.).

Figure 1:
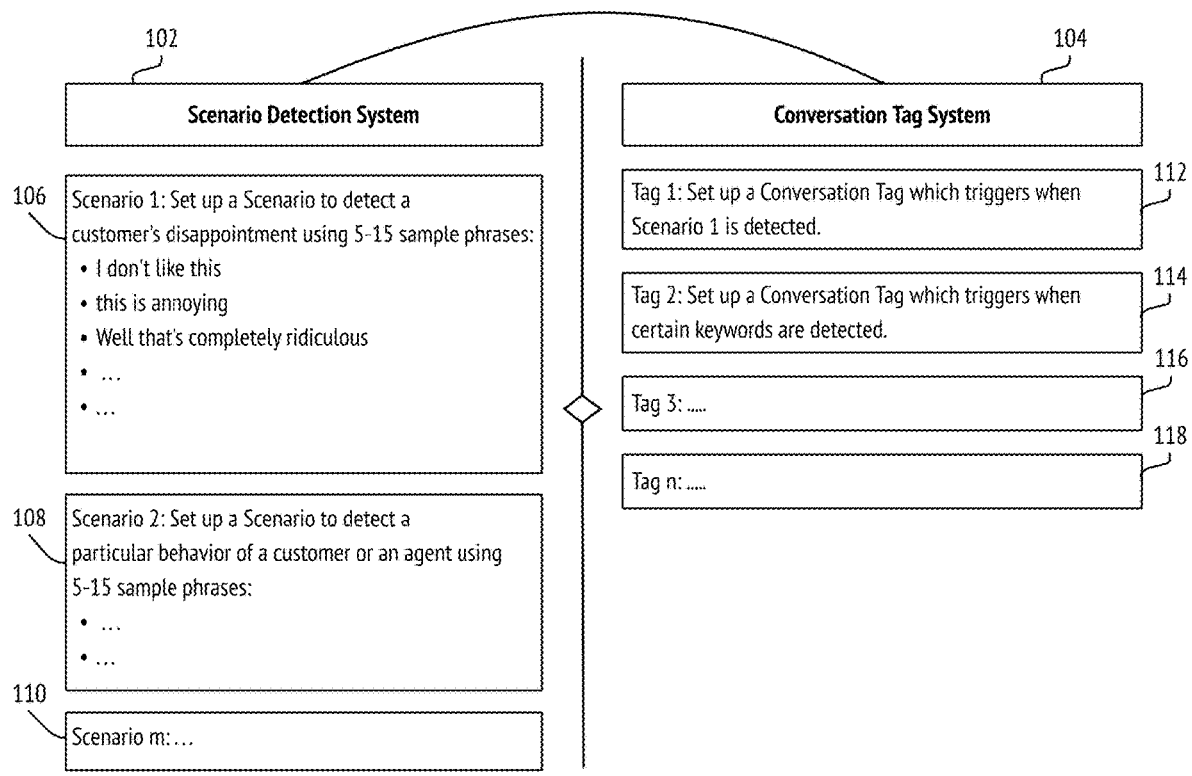
FIG. 1 shows an example high level diagram of a scenario detection system and a conversation tag system, in accordance with the examples disclosed herein.

FIG. 1 shows an example high level diagram of a scenario detection system 102 and a conversation tag system 104, in accordance with the examples disclosed herein. An integrated system of "scenarios and conversation tags" enables clients to configure various types of events to be detected. The "scenarios" portion of the integrated system is a behavior detection system, and the "conversation tags" portion of the integrated system is an alarm system. The alarm is triggered contingent on detection of a scenario, and, in some embodiments, a few other configuration options.

In some embodiments, a "scenario" is defined to be a behavior that the detection system 102 will detect in each sentence within a given conversation. The system permits a client to describe a scenario using a set of representative phrases. For instance, a "customer disappointed" scenario meant to capture a customer's frustration may be described by the following phrases: "I simply hate this," "this thing has never worked well for me," "what a mess," "I've had enough now." Furthermore, a customer may also add "negative phrases" to the description, which are phrases that seem close to phrases that describe a desired scenario but where the client does not wish to trigger the scenario. For example, in the "customer disappointed" scenario, a client may not wish this scenario to trigger for sentences similar to "this is confusing," and so such sentences may be added to the set of negative phrases.

On its own, a scenario detected by the detection system 102 for a sentence may not be shown to clients. In contrast, a scenario may trigger a "conversation tag," which may be shown to clients, depending on the set configuration options. In some embodiments, a "conversation tag" is a text string label assigned to a dialogue from a conversation. It is assigned to a dialogue based on the following criteria:

1. Who is the speaker of the dialogue? A user may configure this to be one of "agent" or "customer."
2. (a) Whether the dialogue conveys a specific intent (as described in a "scenario"), e.g., a tag called "frustrated customer" may be based on a "scenario" that describes a situation where the customer is complaining about pricing, or
   (b) whether the dialogue contains some specific keywords.
3. Whether the tag should apply to dialogues occurring at any time in the conversation or if it should only apply to those occurring within the first N seconds (where N is configured by the user).

Some potential configuration options are listed below:
1. Speaker: Whether the tag should trigger only for the agents' sentences, or customers' sentences, or a sequence of an agent sentence followed by a customer sentence. The last option is called a "dynamic tag."
2. Speaker behavior: Whether the tag should trigger if the "speaker" mentioned a particular phrase or whether it should trigger if a particular scenario in the speaker's sentence is detected. Because this is a configurable feature, "speaker behavior" may refer to any behavior on the part of the speaker. For example: (A) "frustration with pricing" is a behavior where the customer is complaining about high prices or better prices elsewhere; (B) "proper introductory greeting" is a behavior where the agent greets the customer, e.g., by saying: "thanks for calling ABC Company; how can I help you?"; (C) "asking for refunds" is a behavior where a customer is for some reason asking about the process to return their product for a refund.
3. Timing: Whether the tag triggers at all times in a conversation or if it triggers only within the first X seconds of the conversation (where X is preset by the client).

As shown in FIG. 1, the client begins by configuring the scenario detection system 102 so that it contains any number of scenarios, e.g., scenario 1 106, scenario 2 108, and scenario m 110. Each scenario encapsulates some behavior of a customer or an agent. To set up a scenario, the client provides a list of several (e.g., 5 to 15) associated example phrases that capture how the behavior would be exhibited by a customer or agent. For example, to detect the "customer disappointment" scenario as shown in scenario 1 106, the following phrases are associated with that scenario: "I don't like this," "this is annoying," "well, that's completely ridiculous." To detect the "customer frustration" scenario, an example phrase could be: "I simply hate your after-sales support."

Once a set of scenarios and associated lists of phrases have been set up into the scenario detection system 102 (a behavior detection system), the client may configure the "conversation tags" system 104 (an alarm system), which triggers whenever a scenario is detected in customer/agent utterances. Note that a conversation tag need not always be contingent on the detection of a scenario; a client may configure it to trigger only under certain circumstances, such as only when certain exact keywords are detected in customer/agent utterances. For example, tag 1 112 sets up a conversation tag which triggers when scenario 1 106 is detected and tag 2 114 sets up a conversation tag which triggers when certain keywords are detected. Other tags, e.g., tag 3 116 and tag n 118, may also be established.

In some embodiments, triggering a conversation tag is based on a label of a closest scenario and a plurality of configured options. In some embodiments, the plurality of configured options includes the speaker identity (i.e., whether the speaker is an agent or a customer), where triggering a conversation tag is further based on an identity of a speaker of the utterance. In some embodiments, triggering a conversation tag is further based on whether a sequence of an agent sentence is followed by a customer sentence. In some embodiments, the plurality of configured options includes speaker behavior, where triggering a conversation tag is further based on whether a speaker of the utterance mentioned a particular phrase. In some embodiments, the plurality of configured options includes timing, where triggering a conversation tag is further based on whether the utterance occurred within a preset period of time after a conversation has begun. Timing refers to whether a tag may trigger at any time in the conversation, or if it should only trigger for those dialogues that occurred within the first N seconds, where N is configurable by the user.

Advantages of the integrated scenario detection system 102 and conversation tag system 104 include (1) the ability to tag based on a sequence of customer-agent scenarios ("dynamic tag"), and (2) the ability to make the tag contingent on presence of one of a set of keywords or the presence of a scenario. By separating the behavior detection (via scenario detection) and the alarm system (conversation tags), the client is able to independently configure multiple tags with the same underlying scenario but with different configurations. For example, the system may act differently depending on whether an utterance is from a customer or from an agent, or if the system has a history regarding a particular customer's behavior or mental state.

Retrieve Stage & Rerank Stage of the Scenario Detection System

Figure 2:
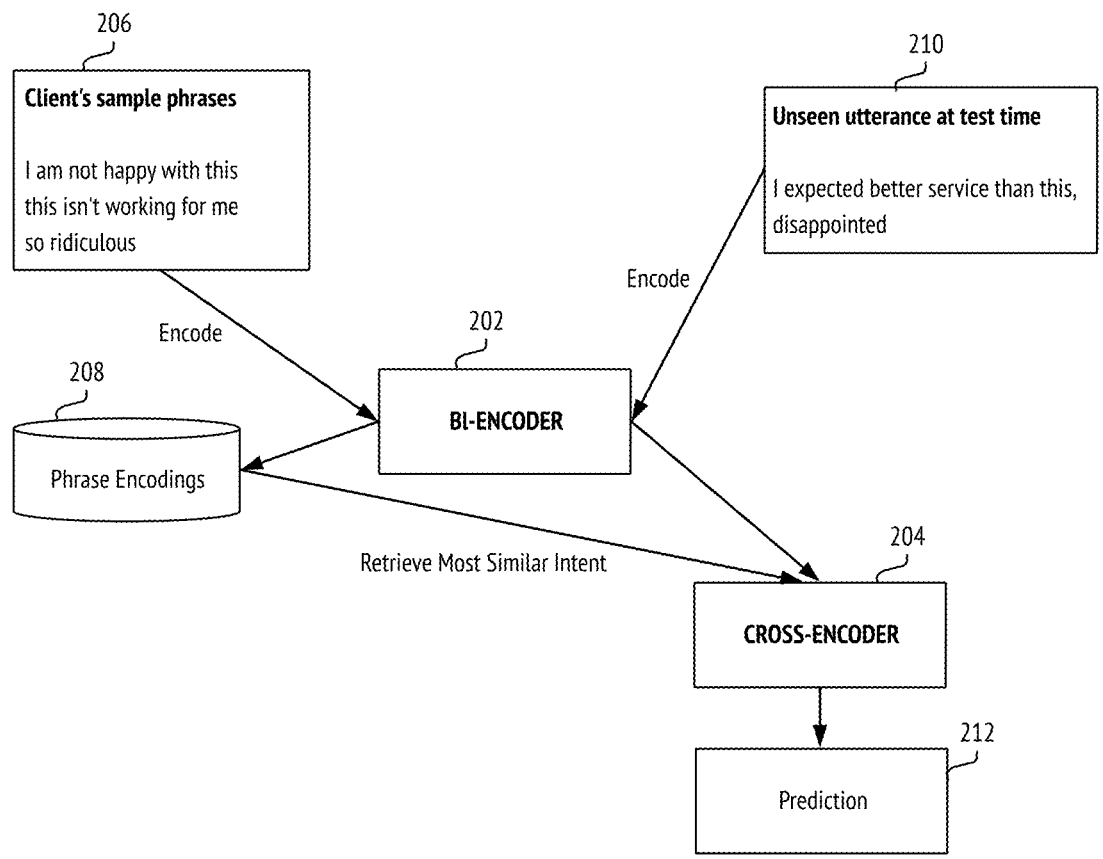
FIG. 2 shows an example overview schematic diagram of the scenario detection system, in accordance with the examples disclosed herein.

FIG. 2 shows an example overview schematic diagram of the scenario detection system, in accordance with the examples disclosed herein. The scenario detection system comprises two stages: a retrieve stage and a rerank stage. The retrieve stage acts as a coarse sieve, where in some embodiments, it is implemented with a bi-encoder model 202, a neural network that encodes a sentence in human language into an embedding vector (or simply "embedding"), which may be an ordered sequence of real numbers. The rerank stage acts as a fine sieve, which in some embodiments is implemented with a cross-encoder model 204. This retrieve-rerank framework is commonly employed in text-based semantic search. However, it may be adapted for scenario detection as described in this disclosure.

The scenario detection system works as follows. First, the client's sample phrases 206 and their associated scenarios are entered into the bi-encoder 202. For example, a "customer disappointed" scenario may be described by the following phrases: "I am not happy with this," "this isn't working for me," and/or "so ridiculous." The bi-encoder 202 encodes such phrases for all scenarios, and then stores them in a database 208 (e.g., "phrase encodings"). In some embodiments, a scenario is encoded as a normalized centroid of embeddings of all input phrases, and a dialogue is encoded during test time as a single normalized embedding. In some embodiments, the centroid of a set of vectors in a vector space is the vector in the vector space that minimizes the weighted sum of the generalized squared distances from each of the vectors in the set of vectors to a point in the vector space. In some embodiments, the distance here is the Euclidean distance. In other embodiments, other geometries are employed. In some embodiments, the weighted sum is an equal sum, where each vector is weighted equally. In the training phase, encoding entails the following: For every scenario, N phrases are taken from the user, where N may vary from a minimum of 3 to any number of phrases the user may want to provide. The N phrases are then encoded separately using a bi-encoder, which generates a vector of size [M×1] (e.g., M=768) for every phrase. The normalized centroid of all the N vectors (essentially the mean of all vectors) for this particular scenario is then calculated, and this encoding forms the encoding for the scenario. For example, consider a user establishing a scenario named "Greeting" and providing five associated phrases. All five phrases are then separately encoded to generate five vectors of size [768×1] and then the normalized centroid of these five encoded vectors are calculated to form the encoding for scenario "Greeting." In the inference phase, encoding entails the following: When a new query Q is received, it is directly encoded using the bi-encoder to generate a vector of size [M×1] (e.g., M=768). In addition, the vector is then normalized as performed for the scenario phrases, and the two are compared to seek a match.

Next, a new sentence from a conversation (e.g., "unseen utterance at test time" 210) is encoded using the bi-encoder 202 and the closest scenario phrase encoding 208 to that sentence is retrieved. For example, the sentences "I expected better service than this" or "disappointed" may result in the phrases associated with the "customer disappointed" scenario being retrieved. Finally, the cross-encoder 204 computes a score associated with the sentence and all client phrases of the closest scenario. If that score exceeds a certain threshold, then the label of that closest scenario is assigned to the sentence as a prediction 212. Otherwise, nothing is assigned to the sentence.

The advantage of the retrieve-rerank implementation over the traditional keyword matching approach is that retrieve-rerank does not rely on the presence of keywords to detect an intent. Instead, it focuses on semantics of a sentence: it maps each sentence to a list of numbers, i.e., an embedding vector, such that the distance between the embedding vectors of sentences with similar meanings is small. This is independent of whether two sentences with similar meanings have the same set of keywords or not.

Figure 3:
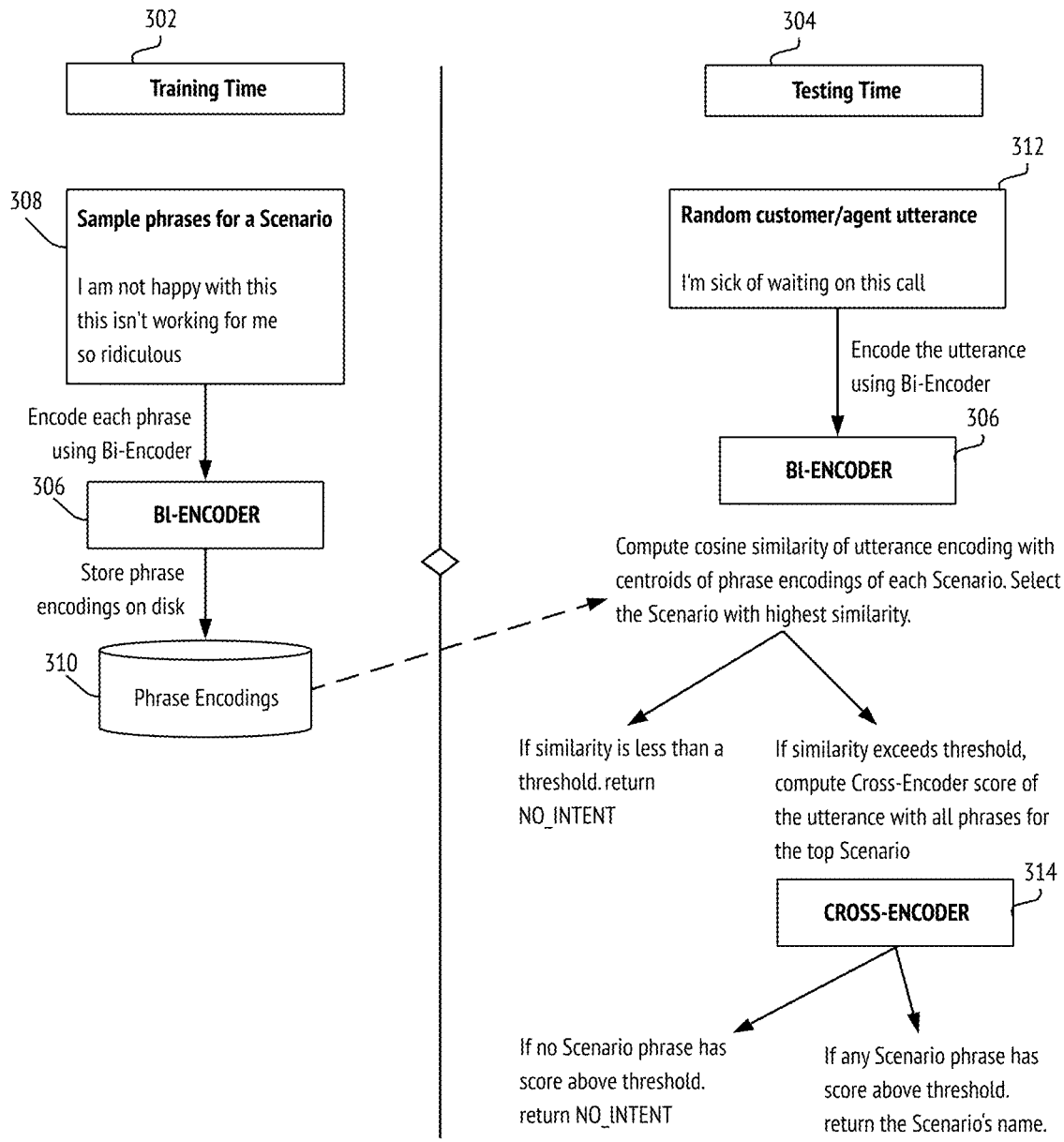
FIG. 3 shows an example detailed diagram of a scenario detection system, in accordance with the examples disclosed herein.

FIG. 3 shows an example detailed diagram of a scenario detection system, in accordance with the examples disclosed herein. The scenario detection system takes actions during training time ("training time") 302 (i.e., a client is setting up a scenario for the first time), and during testing time ("testing time") 304 (i.e., system is attempting to detect the presence of a scenario in a customer or agent utterance).

During training time 302, the bi-encoder 306 takes in a list of sample phrases 308 that can describe a particular scenario. For example, the phrases "I am not happy with this," "this isn't working for me," and "so ridiculous" may be used to describe the scenario in which the "customer disappointed" scenario. The bi-encoder 306 then encodes each phrase provided by the user, and stores these phrase embeddings into a database ("phrase encodings") 310. Encoding is performed as described with reference to FIG. 2.

During testing time 304, the system is given a random or arbitrary utterance 312 from a customer or an agent. This utterance is encoded using the bi-encoder 306. In some embodiments, a first similarity score (e.g., cosine similarity) of the encoding of this utterance 312 with each stored phrase embedding is computed. In other embodiments, the first similarity score (e.g., cosine similarity) of the encoding of this utterance 312 with the centroids of the phrase encodings 310 associated with each scenario in the stored phrase embeddings is computed. The scenario whose phrase embedding has the highest first similarity score with the utterance is retrieved, where the similarity score between two embeddings is calculated as the cosine distance between the two embedding vectors, producing a real number between 0 and 1. If this highest first similarity is below some first threshold score, "no intent" ("NO_INTENT," i.e., no intent matched, intentless) is returned. Otherwise, (i.e., this highest first similarity exceeds some first threshold score), a second similarity score of the utterance 312 with all phrases belonging to the top intent using a cross-encoder 314 is computed.

With regards to the "highest" first similarity: For a single dialogue, its embedding is computed, and then its similarity score with stored embeddings of all scenarios that have been programmed for this client is also computed; the highest similarity score with this dialogue embedding (among all scenarios) is selected. With regards to the concept of "no intent" or "intentless:" Each client programs N intents, where N is any positive integer and a scenario is synonymous with an intent. "No intent" or "intentless" means that the dialogue at hand does not exhibit any intent out of the N that the client has programmed. However, in this case, it may be that the dialogue exhibits some real intent that is not in the set of N programmed intents.

If the second similarity score with any phrase exceeds some second threshold score, the label of the intent is retrieved and generated. Otherwise, i.e., the second similarity score does not exceed some second threshold score, "no intent" ("NO_INTENT," i.e., lack of intent, the utterance is intentless) is returned. With regards to the "first threshold score" and the "second threshold score," the threshold values are chosen as follows: A subset from a set of utterances is selected as a test set and the model is run on this test set. Then, various threshold levels are set and the threshold that generates the best precision and recall on this test set is selected as a suitable threshold score. After significant testing with various clients, a specific threshold value of 0.55 appears to work across all clients sufficiently well. Of course, the threshold value may be adjusted across clients depending on the quality of precision and recall. One measure of performance for these experiments is the average F1 score (i.e., the harmonic average of precision and recall) across all intents present in the test set.

Bi-Encoder

Figure 4:
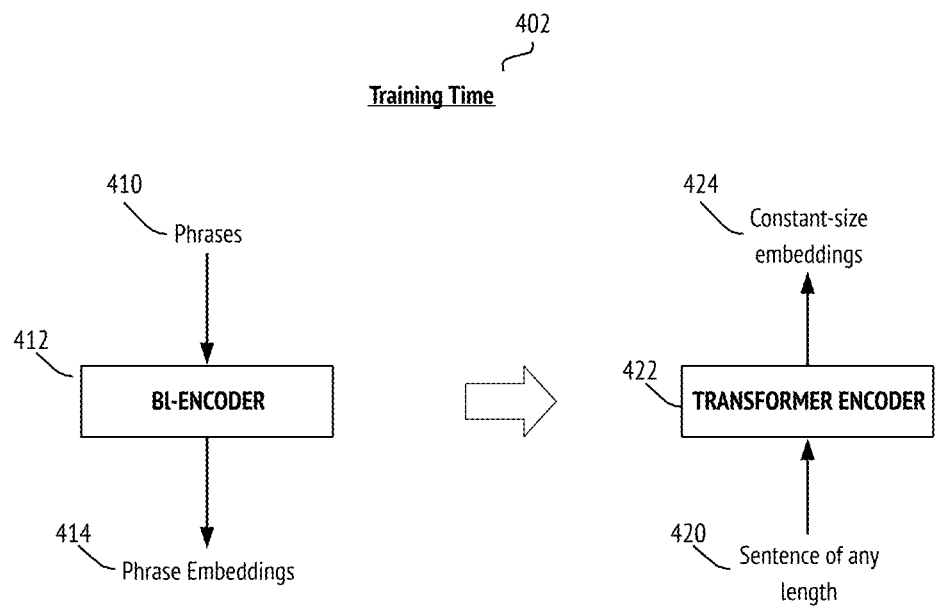
FIG. 4 shows an overview schematic diagram of bi-encoder operation, in accordance with the examples disclosed herein.

FIG. 4 shows an overview schematic diagram of bi-encoder operation during "training time" 402, in accordance with the examples disclosed herein. Phrases 410 are inputted into the bi-encoder 412, which generates phrase embeddings 414. In some embodiments, the bi-encoder 412 includes a large language model (LLM), which includes a transformer encoder 422, and is trained on contrastive loss. Sentences 420 of any length are inputted into the transformer encoder 422, which generates constant-size embeddings 424.

The token space of the bi-encoder 412 is a finite countable set of all tokens, and each token is assigned a unique "token ID." A token in transformer parlance is a sequence of characters. During tokenization, a string is represented as a sequence of tokens, e.g., "hello world" may be represented as these three tokens: ["he," "-llo," "world"]. Thus, each input phrase or sentence is mapped to a single embedding vector. The transformer encoder 422 receives a sentence's representation as a sequence of token IDs and produces a "contextual embeddings," or a sequence of vectors of real numbers. The number of embedding vectors produced equals the number of token IDs in the input sequence. Then the average over those vectors is calculated to generate a single vector representing the embedding of the given phrase or sentence. Thus, a transformer encoder 422 encodes a sentence into a sequence of vectors which captures relationships between various words in the sentence.

To convert input phrases into phrase embeddings, the bi-encoder 412 uses the architecture of a transformer's encoder, which includes several layers, each containing two main sub-components: a multi-head self-attention mechanism and a position-wise feed-forward network. Each of these sub-components is followed by residual connections and layer normalization to help stabilize the learning process. The output of the bi-encoder 412 is configured to generate embeddings of fixed length, i.e., a vector of length 768, independent of what the input phrase or sentence length is.

The contrastive loss is computed via a triplet objective function. Given an anchor sentence a, a positive sentence p, and a negative sentence n, the triplet loss tunes the network such that the distance between a and p is smaller than the distance between a and n. Specifically, the following loss function is minimized: max (|sa−sp|−|sa−sn|+epsilon, 0), with sx representing the sentence embedding for a, n, and p, and |·| representing a distance metric. A margin epsilon ensures that sp is at least closer to sa than sn is. As a metric, the Euclidean distance is used and the margin is set to 1.

Figure 5:
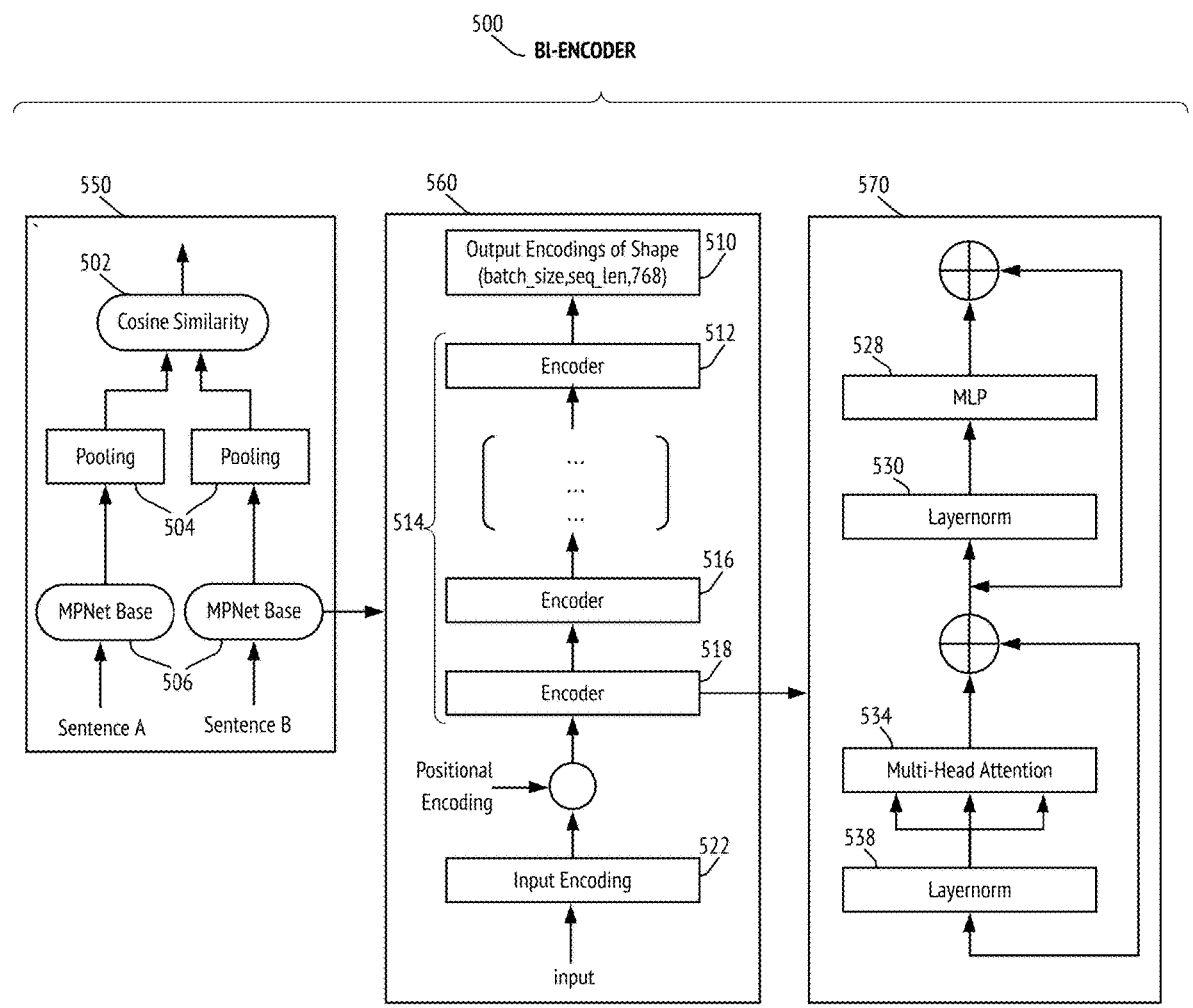
FIG. 5 shows an example block diagram of a bi-encoder, in accordance with the examples disclosed herein.

FIG. 5 shows an example block diagram of a bi-encoder 500, in accordance with the examples disclosed herein. Bi-encoders belong to a transformer-based language model class, specifically designed to generate embeddings of sentences. These tools were first introduced in the paper "Sentence-BERT: Sentence Embeddings using Siamese BERT-Networks" by Reimers et. al. (available at arxiv.org/abs/1908.10084), published in August 2019. These tools were introduced as modifications of a pre-trained BERT (Bidirectional Encoder Representations from Transformers) network that uses Siamese and triplet network structures to derive semantically meaningful sentence embeddings that can be compared using cosine similarity 502. A description of BERT can be found in the paper "A Primer in BERTology: What we know about how BERT works" by Rogers et. al. (available at arxiv.org/abs/2002.12327). The purpose of these models is to convert sentences into vectors such that similar sentence vectors are close to one another in the vector space and dissimilar sentence vectors are far away from one another. The models are successfully applied in many tasks, such as large scale semantic similarity comparison, clustering, and information retrieval via semantic search. Although various embodiments using BERT-based models are described herein, other LLM algorithms or other AI-based approaches are within the scope of the present invention.

In some embodiments, the bi-encoder 500 includes a first component 550, a second component 560, and a third component 570. The first component 550 includes one or more MPNet-based models 506, one or more pooling operations 504, and a cosine similarity operation 502, where MPNet stands for "Masked and Permuted Pre-training for Language Understanding" (see Song et. al. April 2020 paper available at arxiv.org/abs/2004.09297). The second component 560 includes input encoding 522, a number (e.g., 9) of encoder stacks 514 (i.e., a stack of encoders in series, which includes encoder 512, encoder 516, and encoder 518), and output encodings of shape 510. The third component 570 includes a layernorm 530, another layernorm 538, multi-head attention 534, and multilayer perceptron (MLP) 528.

The Siamese network architecture enables fixed-sized vectors for input sentences to be derived. Using a similarity measure, such as cosine similarity 502 or Manhattan/Euclidean distance, semantically similar sentences can be found. Bi-encoder class models add a pooling 504 operation to the output of BERT/ROBERTa to derive a fixed-sized sentence embedding, where ROBERTa stands for "ROBERTa: A Robustly Optimized BERT Pretraining Approach" (see Liu et. al., July 2019, and available at arxiv.org/abs/1907.11692).

The triplet objective function tunes a network such that the distance between an anchor sentence a and a positive sentence p is smaller than the distance between a and a negative sentence n. The loss function for this triplet objective function is described above with reference to FIG. 4. Of the bi-encoder models available in Sentence-BERT and the HUGGING FACE collaboration platform, the all-mpnetbase-v2 model 506 (see huggingface.co/sentence-transformers/all-mpnet-base-v2) has been applied to implement the embodiment described in the present disclosure. This model was developed using the pre-trained MICROSOFT/mpnet-base model 506 (see huggingface.co/microsoft/mpnet-base) and fine-tuning it on a 1 billion sentence pairs dataset by using the following contrastive learning objective: Given a sentence from the pair, the model predicts which sentence out of a set of randomly sampled other sentences was actually paired with it in the dataset. Formally, the cosine similarity 502 from each possible sentence pair from the batch is calculated and then cross entropy loss is applied by comparing with those of true pairs. Given an input sentence, it maps sentences to a multi-dimensional (e.g., 768-dimensional) dense vector that captures the semantic information of the given sentence.

The cross entropy loss is computed as follows: Given an input sentence, the model computes a similarity score between that input sentence and N other sentences (where N is a positive integer) of which one sentence is semantically similar to the input sentence. The softmax operation is applied on these scores to generate a categorical distribution over the N sentences (i.e., the "soft-maxed" scores now sum to unity, i.e., 1). To teach the model to maximize the softmaxed score of the sentence that was semantically closest to the input, the cross entropy loss is calculated as the negative logarithm of the softmaxed-score of this closest sentence. Minimizing this cross entropy loss is equivalent to maximizing the softmax-score.

Specifically, this model encodes the given query (i.e., any sentence from an agent-user conversation) and the intent phrases (i.e., phrases that describe an intent), and then the cosine similarity 502 between these phrases is used to determine the best candidate intent for the given query.

Cross-Encoder

Figure 6:
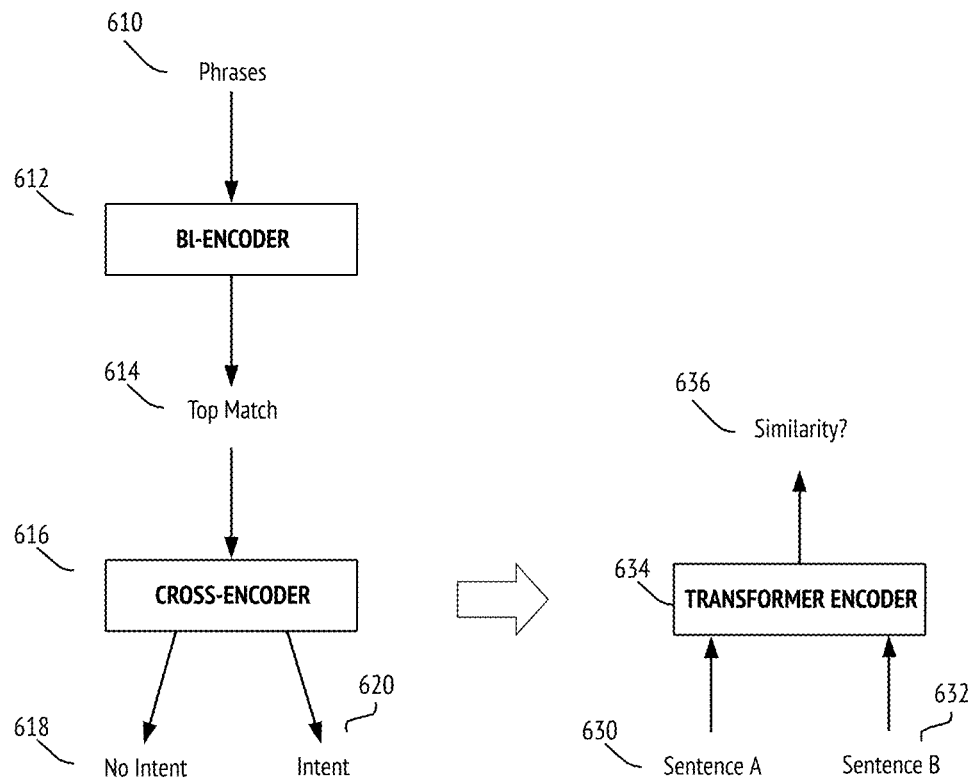
FIG. 6 shows an overview schematic diagram of cross-encoder operation, in accordance with the examples disclosed herein.

FIG. 6 shows an overview schematic diagram of cross-encoder operation during "testing time," in accordance with the examples disclosed herein. In some embodiments, the cross-encoder 616 is a large language model (LLM) that includes a transformer's encoder block and a classification head, trained to detect similarity between two sentences. Phrases 610 are inputted into a bi-encoder 612, which generates a top match 614. The top match 614 is sent to a cross-encoder 616, which returns either "no intent" 618 or "intent" 620. Then, a transformer encoder 634 is able to accept sentences (e.g., sentence A 630 and sentence B 632) to generate a similarity score 636.

The model's output is a metric for similarity, so the cross-encoder takes in two sentences as input and generates an output x, where x is a real number between 0 and 1. The number x represents the probability of similarity between the two given inputs, where 0 represents non-similarity and 1 represents identical inputs. A threshold mechanism on the output x given the model decides between "intent" and "no intent." Heuristically, a threshold of 0.55 appears suitable for many applications. For example, suppose the intent match from the bi-encoder phase is "Greeting." Then, all the phrases from the intent "Greeting" are paired up with the query. Thus, if there are five phrases associated with the intent "Greeting," then five phrase-query pairs (e.g., [phrase_a, query], [phrase_b, query]) are generated. These are sent to the cross-encoder and a score for each phrase-query pair is determined. If any of these five scores are above a threshold (e.g., 0.55), then that query is given the intent "Greeting." Otherwise, the query is said to have "No Intent." The classification head includes a simple feed forward layer, which takes the embeddings from the last transformer encoder layer and generates a single number representing the probability of how similar both the input sentences were.

Figure 7:
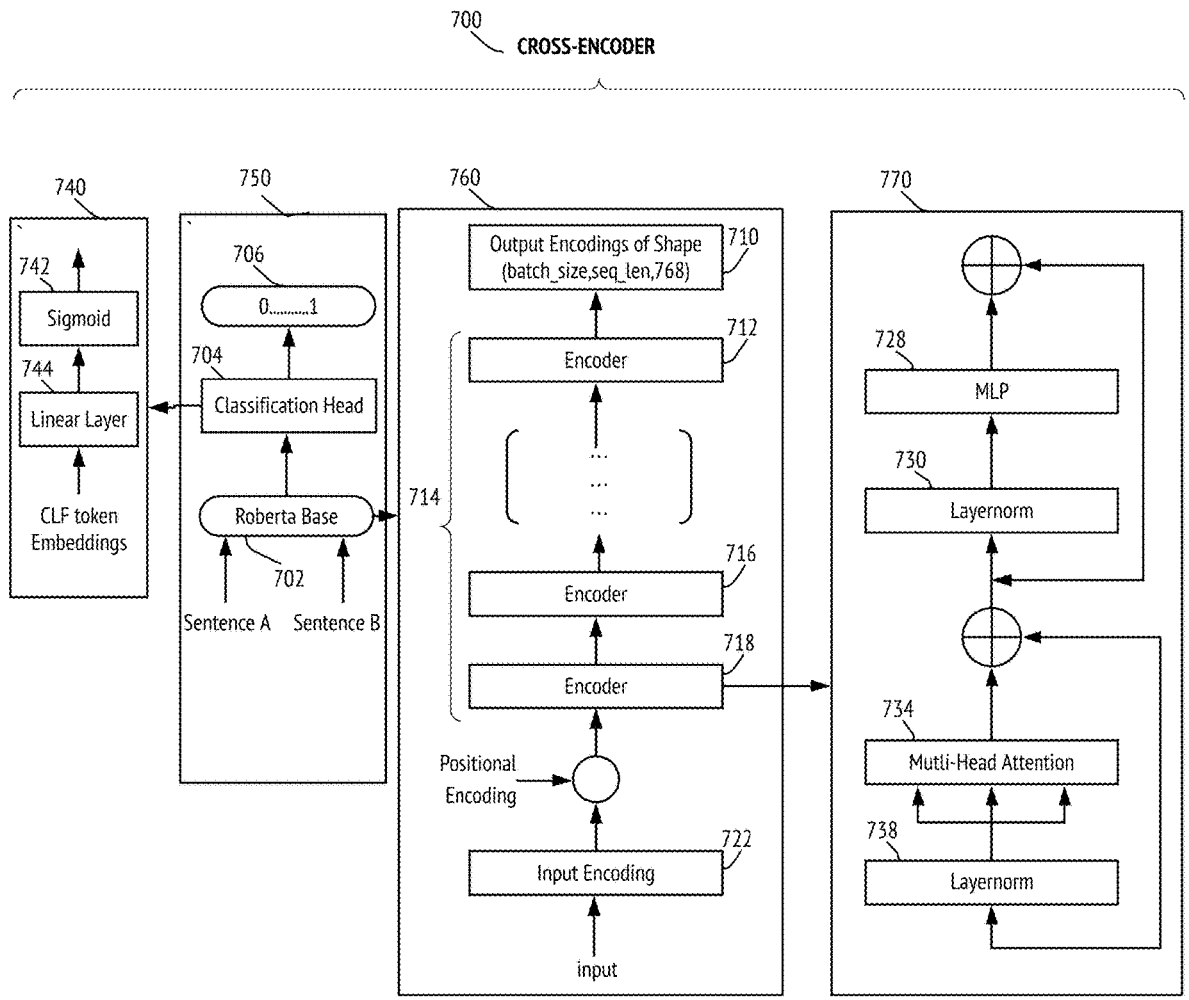
FIG. 7 shows an example block diagram of a cross-encoder, in accordance with the examples disclosed herein.

FIG. 7 shows an example block diagram of a cross-encoder, in accordance with the examples disclosed herein. Cross-encoder models also belong to a transformer-based language model class, but unlike bi-encoders, which generate a sentence embedding for a given sentence, cross-encoders generate an output value (e.g., between 0 and 1) indicating the similarity of an input sentence pair. A user or system may provide to a bi-encoder independently sentences A and B, which result in the respective sentence embeddings u and v, while for a cross-encoder, a user or system provides two sentences simultaneously by pairing them. A cross-encoder does not produce a sentence embedding. While a cross-encoder generally produces better results on sentence similarity than a bi-encoder does, it can be computationally expensive, and hence may be impractical for a very large semantic search type operation. Cross-encoders are mostly used whenever the user has a predefined set of sentence pairs to score. For example, a user desires the similarity scores for 100 sentence pairs.

Of the cross-encoder models available in Sentence-BERT and the HUGGING FACE collaboration platform, the stsb-roberta-base model 702 (see huggingface.co/cross-encoder/stsb-roberta-base) has been applied to implement the present disclosure. This model was developed using the pre-trained Roberta-base model 702 (see huggingface.co/roberta-base) and fine-tuning it on a sentence similarity dataset, where given a sentence pair, the model's objective outputs a value between 0 and 1, where a value closer to 0 indicates dissimilarity between two sentences and a value closer to 1 indicates similarity between the two sentences. Specifically the model helps confirm whether the candidate that the bi-encoder tagged as an intent for a given query appropriately belongs to that particular intent class.

In some embodiments, the cross-encoder 700 includes a first component 740, a second component 750, a third component 760, and a fourth component 770. The first component 740 includes a linear layer 744 that accepts CLS ("Classification") token embeddings and a sigmoid operator 742. The second component 750 includes a Roberta-base model 702 that accepts sentences (e.g., sentence A, sentence B) and a classification head 704 that outputs a value 706 (e.g., between 0 and 1). The third component 760 includes input encoding 722, a number (e.g., 9) of encoder stacks 714 (i.e., a stack of encoders in series, which includes encoder 712, encoder 716, and encoder 718), and output encodings of shape 710. The fourth component 770 includes a layernorm 730, another layernorm 738, multi-head attention 734, and multilayer perceptron (MLP) 728.

The bi-encoder and the cross-encoder coordinate their actions, where the retrieval stage uses the bi-encoder and the rerank stage uses the cross-encoder. In particular, the bi-encoder model is trained on cosine similarity loss and strives to generate high-quality sentence embeddings. In this stage, the system marks the query at hand to a particular intent out of a set of intents. This step may be considered an "intent vs intent classifier," i.e., its job is to decide to which intent the new query belongs. Next, the rerank stage is the final decider. The model distinguishes between "intent" and "no intent" ("NO_INTENT," i.e., lack of intent, the utterance is intentless), but in the absence of a model trained for that particular task, a proxy task is performed instead, where the phrases of the given intent are compared with the query at hand. Based on which phrase is the most similar, "intent" or "no intent" ("NO_INTENT," i.e., lack of intent, the utterance is intentless), is determined.

While the concept of semantic search has been limited to information retrieval and knowledge search, the present disclosure uses embedding based search as a pseudo-task for intent detection. In particular, the system does not match a query with the phrases directly at the bi-encoder stage, but instead matches the query embeddings with intent embeddings, where intent embeddings are found by taking the centroid of all the phrase embeddings for that particular intent. Bi-encoders are generally used to fetch the top few (e.g., 5-10) matching sentences or paragraphs in information retrieval or knowledge search, whereas in the present disclosure, generally only the top choice is returned. In addition, a threshold on the similarity between the query and the centroid of intents, i.e., a hyperparameter, may be used. In some embodiments, a validation set on which the threshold is based maximizes the micro-average precision and recall.

Finally, cross-encoders are generally used to rerank and order predictions coming from a bi-encoder in order to generate relevant outputs at the top, whereas the present disclosure uses the cross-encoder similarity output as a "pseudo" in order to determine "intent" versus "no intent" ("NO_INTENT," i.e., lack of intent, the utterance is intentless) given an intent recommendation from the bi-encoder. A query is classified as an "intent" or as a "no intent" ("NO_INTENT," i.e., lack of intent, the utterance is intentless) using a threshold on the similarity score from the cross-encoder. This threshold is again a hyperparameter, which may be obtained by optimizing the Micro Average Precision and Recall on a validation set.

Figure 8:
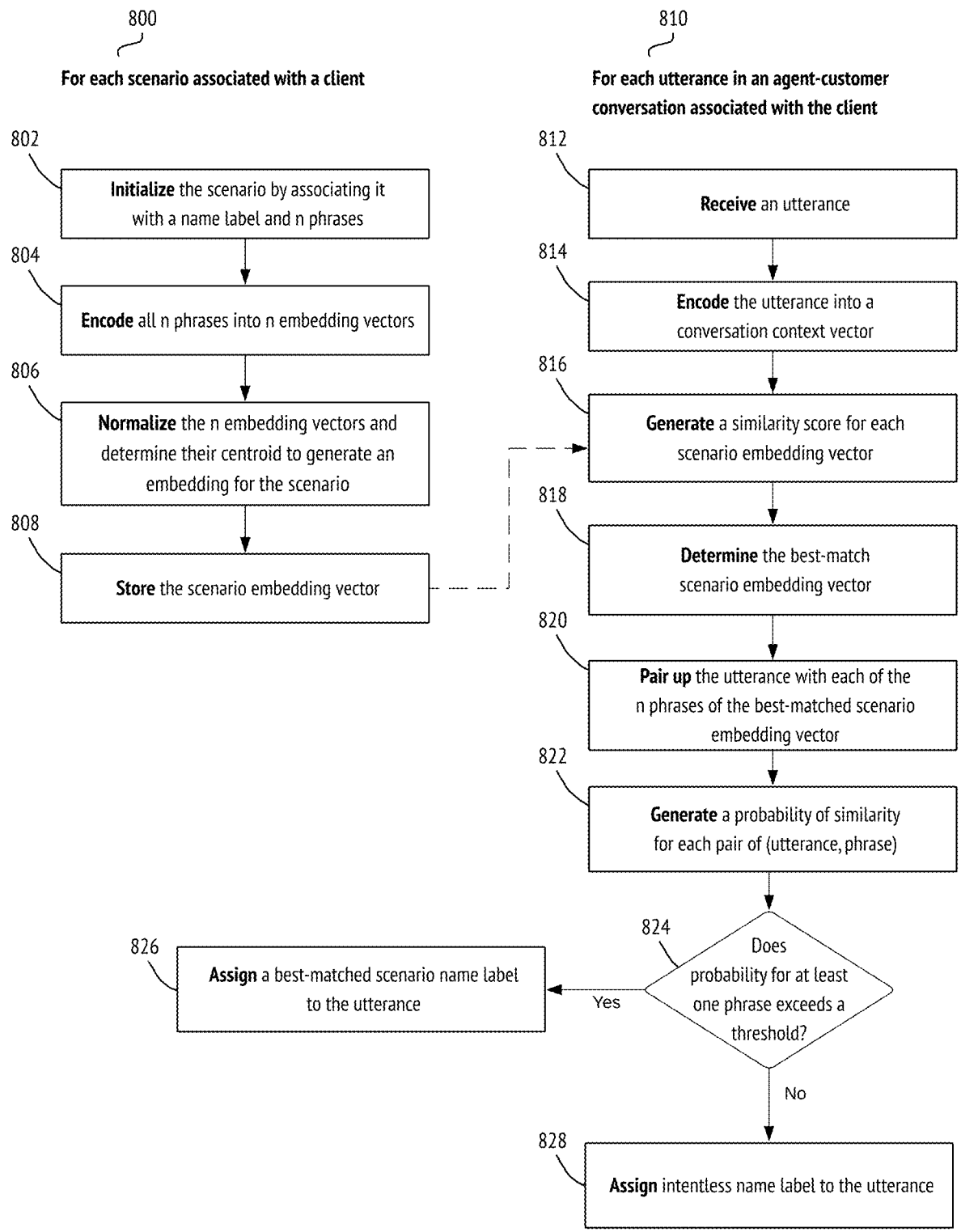
FIG. 8 shows an example flow diagram detailing the operation of a scenario detection and conversation tag system, in accordance with the examples disclosed herein.

FIG. 8 shows an example flow diagram detailing the operation of a scenario detection and conversation tag system, in accordance with the examples disclosed herein. For each scenario 800 associated with a client, the operation takes steps 802, 804, 806, and 808. In step 802, the system initializes the scenario by associating it with a name label (e.g., a text string), and n phrases, where n is some positive integer. The number n may be different for each scenario. In step 804, the system encodes all n phrases into n embedding vectors (i.e., "phrase encodings") using a bi-encoder. In step 806, the system normalizes the n embedding vectors and determines their centroid to generate a scenario embedding vector (i.e., "scenario encoding"). Finally, in step 808, the system stores the scenario embedding vector into a database. In some embodiments, in step 808, the system stores the scenario embedding vector, the name label, and the list of n embedding vectors as an associated group into the database.

Next, for each utterance 810 in an agent-customer conversation associated with the client, and for each defined scenario, the operation takes steps 812, 814, 816, 818, 820, 822, 824, 826, and 828. In some embodiments, the system decomposes the conversation into a set of utterances i.e., the conversation comprises utterances, and the bi-encoder is ready to receive utterances. In alternative embodiments, the conversation is already pre-decomposed into a set of utterances. For each utterance 810, the following steps are taken: In step 812, the bi-encoder receives an utterance. In step 814, the system encodes the utterance into a conversation context vector using the bi-encoder. In step 816, the system compares the conversation context vector with the scenario embedding vectors stored in the database, and generates a similarity score for each scenario embedding vector stored in the database. In some embodiments, the similarity score is a cosine similarity score. In step 818, the system determines the best-match scenario embedding vector, i.e., the scenario embedding vector that best matches the conversation context vector of the utterance, using the bi-encoder. In some embodiments, determining the best match entails identifying the scenario embedding vector whose similarity score is the highest. In step 820, the system pairs up the utterance with each of the n phrases associated with the best-matched scenario embedding vector to generate ordered pairs, such as "(utterance A, phrase 1 of matched scenario)," "(utterance A, phrase 2 of matched scenario)," and "(utterance A, phrase 3 of matched scenario)." In step 822, using the cross-encoder, the system generates a probability of similarity for each generated ordered pair of (utterance, phrase). In some embodiments, this probability of similarity corresponds to the second similarity score referenced in FIG. 3. In step 824, the system determines whether the probability for at least one phrase associated with the best-matched scenario embedding vector exceeds a preset threshold (e.g., 0.55). If "yes" (step 826), then the bi-encoder is considered to be "correct," and a best-matched scenario name label associated with the best-matched scenario embedding vector is assigned to the utterance. In some embodiments, other information associated with the best-matched scenario, such as intent, is also assigned to the utterance. Otherwise (step 828), the bi-encoder is considered to be "wrong," and an intentless name label (i.e., "no intent") is assigned to the utterance.

Figure 9:
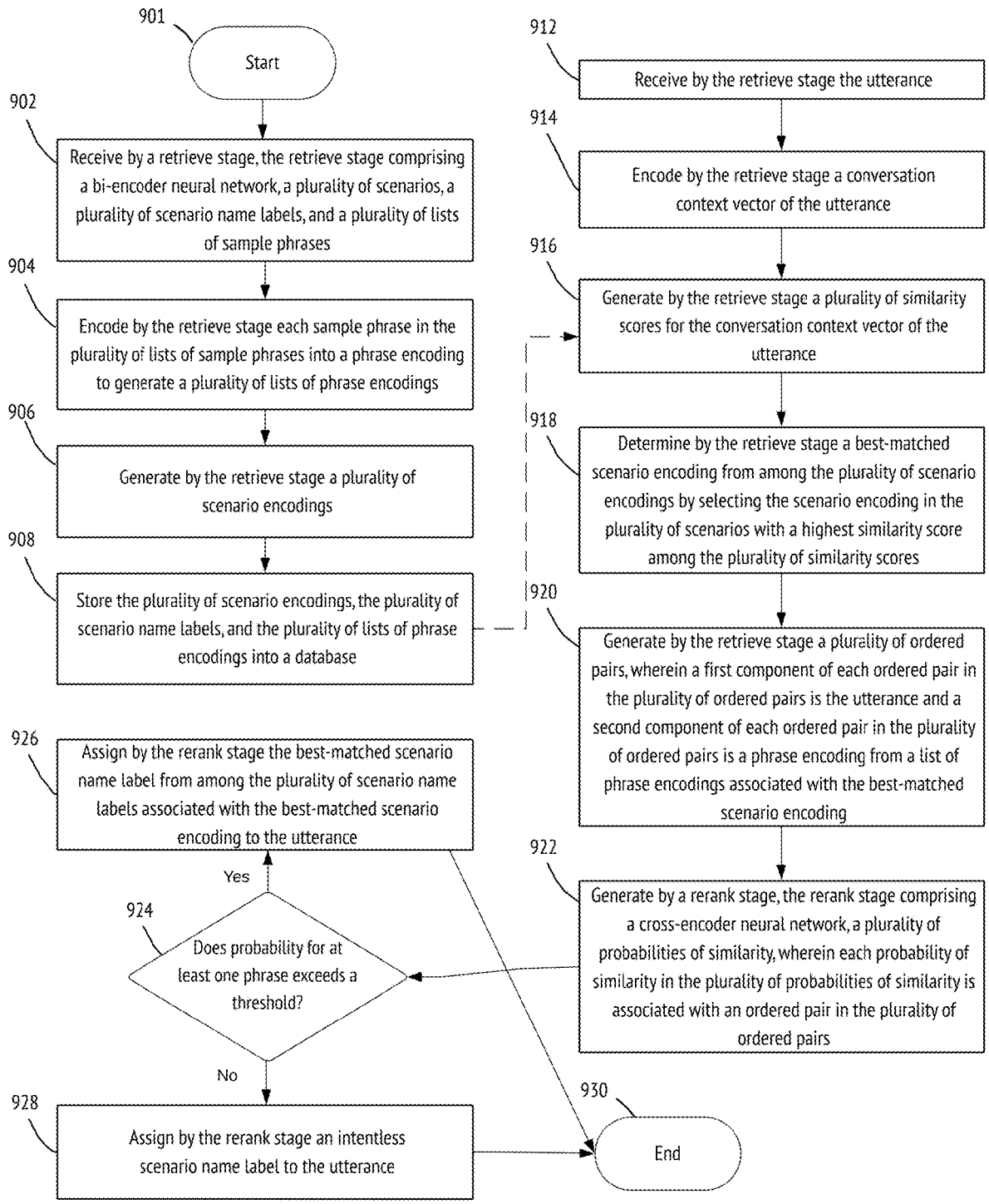
FIG. 9 shows another flow diagram detailing the operation of a scenario detection and conversation tag system, in accordance with the examples disclosed herein.

FIG. 9 shows another flow diagram detailing the operation of a scenario detection and conversation tag system, in accordance with the examples disclosed herein. In particular, the flow diagram determines a best-matched scenario name label for an utterance during automatic scenario detection in customer-agent conversations.

The operation begins in step 901.

In step 902, the system receives by a retrieve stage, the retrieve stage comprising a bi-encoder neural network, a plurality of scenarios, a plurality of scenario name labels, and a plurality of lists of sample phrases, wherein each scenario in the plurality of scenarios is associated with a name label in the plurality of name labels and with a list of sample phrases in the plurality of lists of sample phrases.

In step 904, the system encodes by the retrieve stage each sample phrase in the plurality of lists of sample phrases into a phrase encoding to generate a plurality of lists of phrase encodings.

In step 906, the system generates by the retrieve stage a plurality of scenario encodings, wherein each scenario encoding in the plurality of scenario encodings is associated with a scenario in the plurality of scenarios, is associated with a name label in the plurality of scenario name labels, and is associated with a list of phrase encodings in the plurality of lists of phrase encodings, and wherein each scenario encoding in the plurality of scenario encodings is based on normalizing and determining the centroid of a list of phrase encodings associated with the scenario in the plurality of scenarios.

In step 908, the system stores the plurality of scenario encodings, the plurality of scenario name labels, and the plurality of lists of phrase encodings into a database.

In step 912, the system receives by the retrieve stage the utterance.

In step 914, the system encodes by the retrieve stage a conversation context vector of the utterance.

In step 916, the system generates by the retrieve stage a plurality of similarity scores for the conversation context vector of the utterance, wherein each similarity score in the plurality of similarity scores is associated with a scenario encoding in the plurality of scenario encodings stored in the database.

In step 918, the system determines by the retrieve stage a best-matched scenario encoding from among the plurality of scenario encodings by selecting the scenario encoding in the plurality of scenarios with a highest similarity score among the plurality of similarity scores.

In step 920, the system generates by the retrieve stage a plurality of ordered pairs, wherein a first component of each ordered pair in the plurality of ordered pairs is the utterance and a second component of each ordered pair in the plurality of ordered pairs is a phrase encoding from a list of phrase encodings associated with the best-matched scenario encoding.

In step 922, the system generates by a rerank stage, the rerank stage comprising a cross-encoder neural network, a plurality of probabilities of similarity, wherein each probability of similarity in the plurality of probabilities of similarity is associated with an ordered pair in the plurality of ordered pairs.

In step 924, the system determines by the rerank stage whether at least one probability of similarity in the plurality of probabilities of similarity exceeds a preset threshold.

In step 926, the system assigns by the rerank stage the best-matched scenario name label from among the plurality of scenario name labels associated with the best-matched scenario encoding to the utterance if at least one probability of similarity in the plurality of probabilities of similarity exceeds a preset threshold.

Finally, in step 928, the system assigns by the rerank stage an intentless scenario name label to the utterance if no probability of similarity in the plurality of probabilities of similarity exceeds the preset threshold.

This concludes the operation (step 930).

Figure 10:
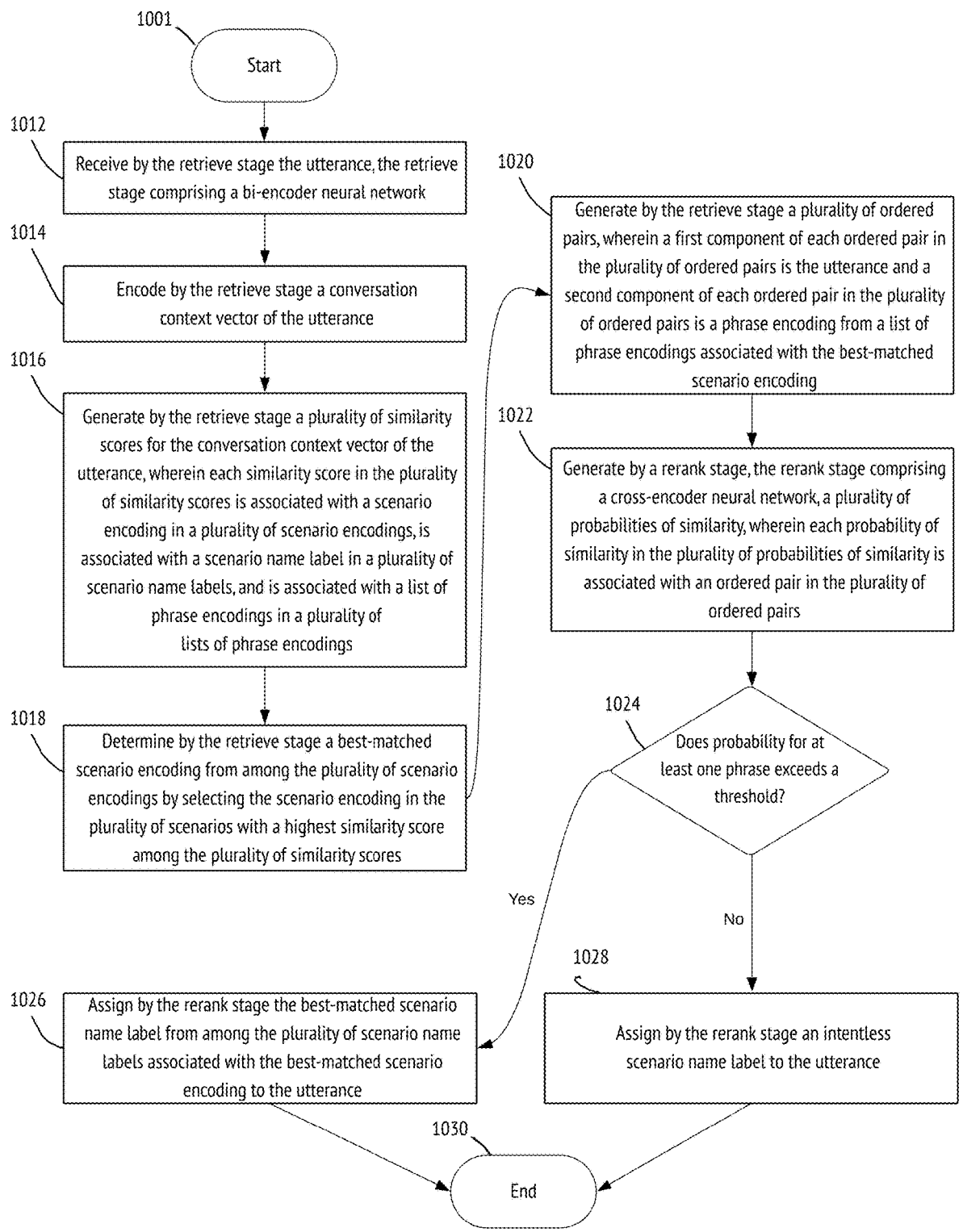
FIG. 10 shows yet another flow diagram detailing the operation of a scenario detection and conversation tag system, in accordance with the examples disclosed herein.

FIG. 10 shows yet another flow diagram detailing the operation of a scenario detection and conversation tag system, in accordance with the examples disclosed herein. In particular, the flow diagram determines a best-matched scenario name label for an utterance during automatic scenario detection in customer-agent conversations.

The operation begins in step 1001.

In step 1012, the system by a retrieve stage the utterance, the retrieve stage comprising a bi-encoder neural network.

In step 1014, the system encodes by the retrieve stage a conversation context vector of the utterance.

In step 1016, the system generates by the retrieve stage a plurality of similarity scores for the conversation context vector of the utterance, wherein each similarity score in the plurality of similarity scores is associated with a scenario encoding in a plurality of scenario encodings, is associated with a scenario name label in a plurality of scenario name labels, and is associated with a list of phrase encodings in a plurality of lists of phrase encodings.

In step 1018, the system determines by the retrieve stage a best-matched scenario encoding from among the plurality of scenario encodings by selecting the scenario encoding in the plurality of scenarios with a highest similarity score among the plurality of similarity scores.

In step 1020, the system generates by the retrieve stage a plurality of ordered pairs, wherein a first component of each ordered pair in the plurality of ordered pairs is the utterance and a second component of each ordered pair in the plurality of ordered pairs is a phrase encoding from a list of phrase encodings associated with the best-matched scenario encoding.

In step 1022, the system generates by a rerank stage, the rerank stage comprising a cross-encoder neural network, a plurality of probabilities of similarity, wherein each probability of similarity in the plurality of probabilities of similarity is associated with an ordered pair in the plurality of ordered pairs.

In step 1024, the system determines by the rerank stage whether at least one probability of similarity in the plurality of probabilities of similarity exceeds a preset threshold.

In step 1026, the system assigns by the rerank stage the best-matched scenario name label from among the plurality of scenario name labels associated with the best-matched scenario encoding to the utterance if at least one probability of similarity in the plurality of probabilities of similarity exceeds a preset threshold.

Finally, in step 1028, the system assigns by the rerank stage an intentless scenario name label to the utterance if no probability of similarity in the plurality of probabilities of similarity exceeds the preset threshold.

This concludes the operation (step 1030).

Figure 11:
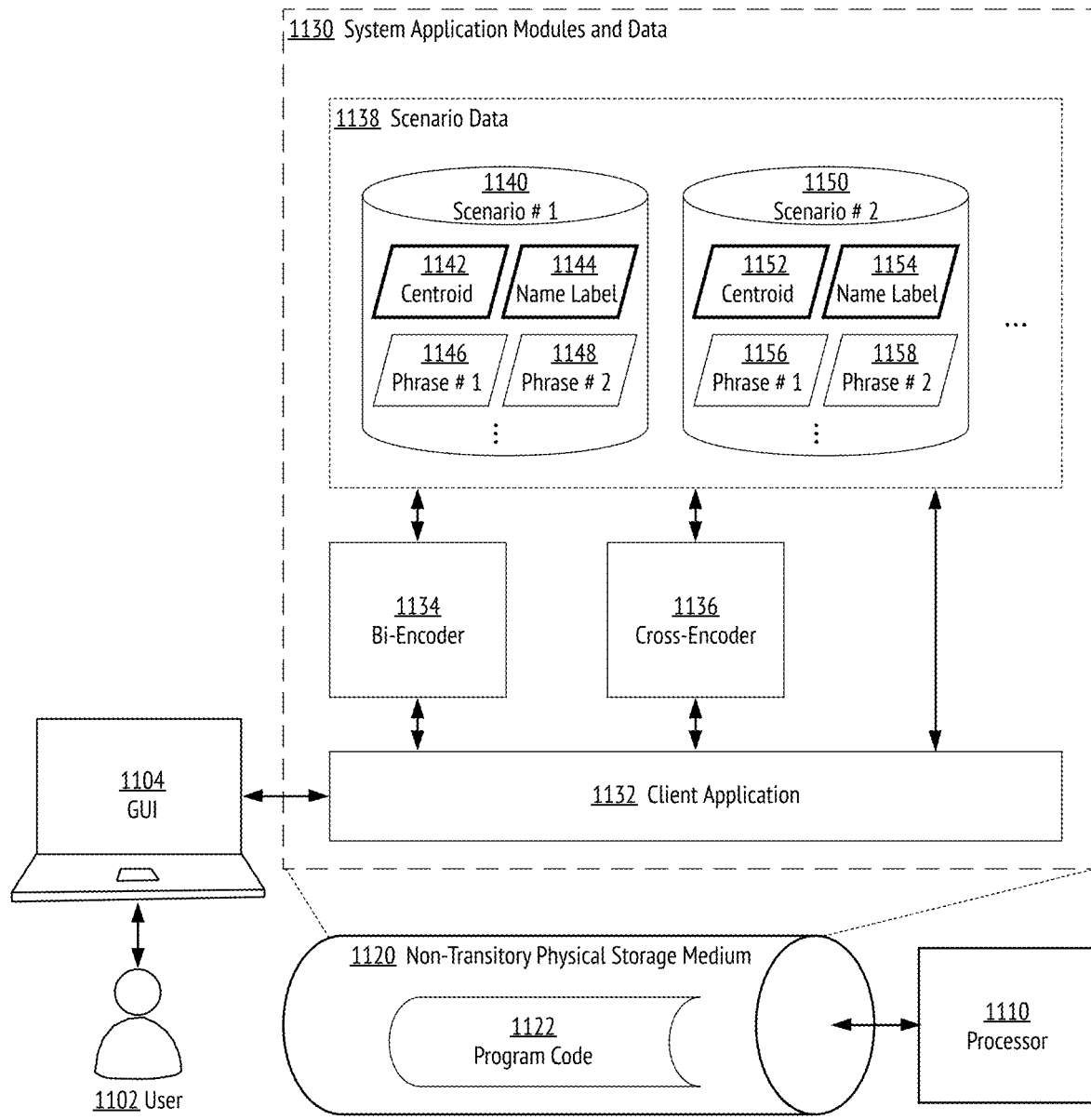
FIG. 11 shows a system diagram illustrating a scenario detection and conversation tag system, in accordance with the examples disclosed herein.

FIG. 11 shows a system diagram illustrating a scenario detection and conversation tag system, in accordance with the examples disclosed herein. The system includes access to at least one hardware processor 1110 responsible for executing program code 1122 to implement the modules 1130 described below. The system includes access to at least one non-transitory physical storage medium 1120, accessible by the at least one hardware processor 1110, which stores the program code 1122 that is executable by the hardware processor 1110. The program code may be stored and distributed among two or more non-transitory physical storage media, and may be executed by two or more processors. The system may further include a Graphical User Interface (GUI) 1104 allowing a user 1102 (e.g., a client or an agent) to interact with the system modules 1130.

In various embodiments, the scenario detection and conversation tag system may incorporate the modules and databases described in the present disclosure, including:

- a client application 1132 for coordinating the scenario detection and conversation tag system and for running the various methods described herein,
- a bi-encoder ML model 1134 trained to generate embedding or context vectors from sentences, as further detailed in the present disclosure,
- a cross-encoder ML model 1136 trained to compare embedding and/or context vectors, as further detailed in the present disclosure,
- a scenario database 1138, including data associated with one or more scenarios (e.g., 1140, 1150). For any given scenario, the scenario data 1138 includes one centroid embedding vector, one name label, as well as a number of phrase embedding vectors related to that scenario. For example, for scenario #1 (1140), FIG. 11 shows centroid embedding vector 1142, name label 1144, and phrase embedding vectors 1146, 1148, etc., and for scenario #2 (1150), FIG. 11 shows centroid embedding vector 1152, name label 1154, and phrase embedding vectors 1156, 1158, etc.

Graphical User Interface (GUI) Implementation

Figure 12:
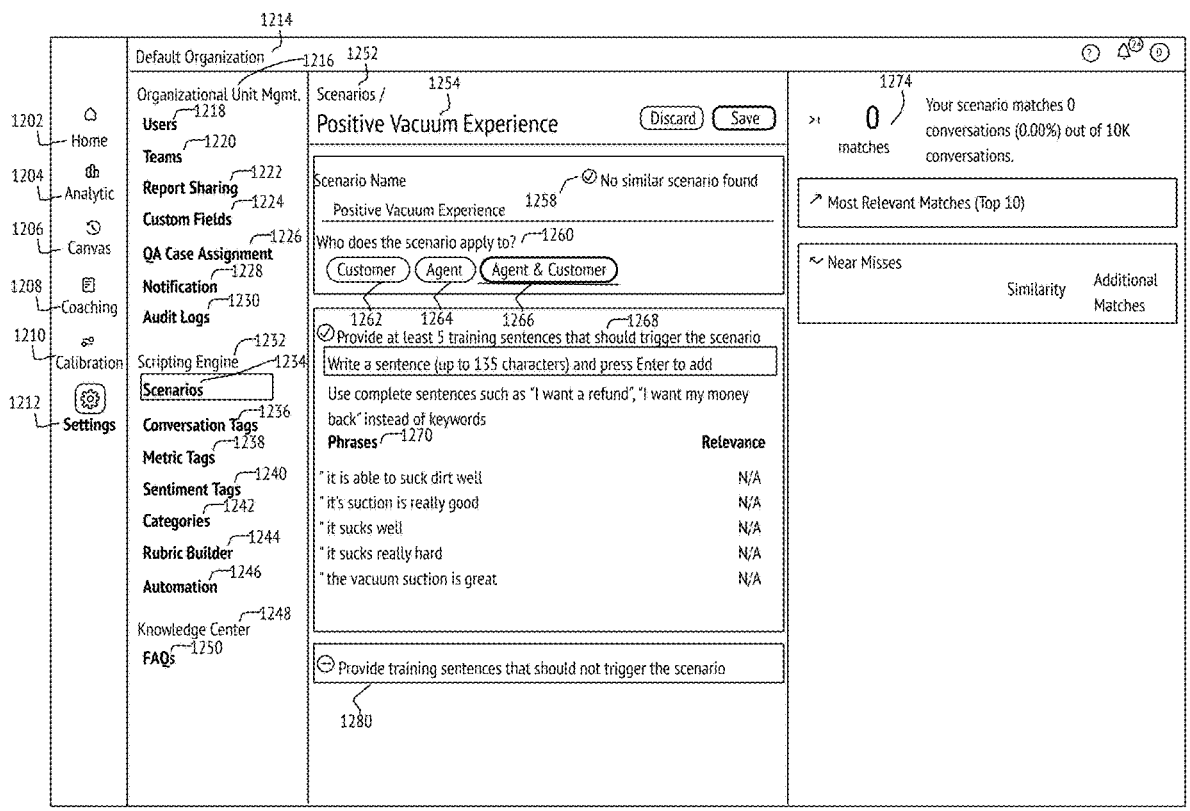
FIG. 12 shows a first example graphical user interface (GUI) as it relates to a scenario detection and conversation tag system, according to exemplary embodiments of the present invention.

FIG. 12 shows a first example graphical user interface (GUI) as it relates to a scenario detection and conversation tag system, according to exemplary embodiments of the present invention. A default organization 1214 is able to use the GUI to train the scenario detection and conversation tag system. The left-side menu includes options for home 1202, analytics 1204, canvas 1206, coaching 1208, calibration 1210, and settings 1212. Organizational unit management 1216 includes options for users 1218, teams 1220, report sharing 1222, custom fields 1224, QA case assignment 1226, notification 1228, and audit logs 1230. Scripting engine 1232 includes options for scenarios 1234, conversation tags 1236, metric tags 1238, sentiment tags 1240, categories 1242, rubric builder 1244, and automation 1246. Knowledge center 1248 includes option FAQs 1250.

When scenarios 1234 is selected, the scenarios 1252 window allows the user to enter a scenario name, e.g., "positive vacuum experience" 1254 for a vacuum cleaner product. The GUI would indicate "no similar scenario found" 1258 if there are no existing scenarios similar to the one entered. The user then may select 1260 whom the scenario applies to, choosing among just the customer 1262, just the agent 1264, and both the agent and the customer 1266. The user is then prompted 1268 to enter a number (e.g., 5) of training sentences that should trigger the scenario. The entered phrases 1270 are then displayed, e.g., "it is able to suck dirt well." The user may also provide 1280 training sentences that should not trigger the scenario.

The GUI indicates 1274 whether the entered scenario matches any of the accessible stored conversations. In the case shown, there are zero matches.

Figure 13:
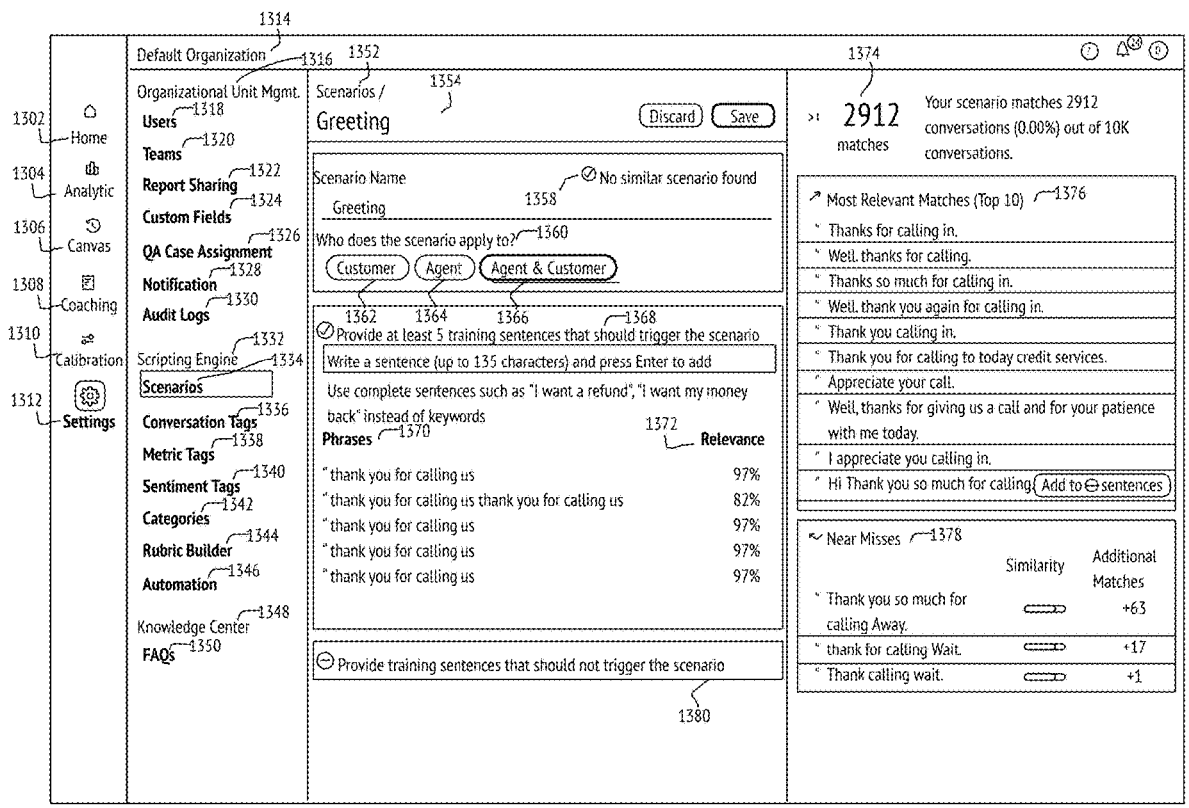
FIG. 13 shows a second example graphical user interface (GUI) as it relates to a scenario detection and conversation tag system, according to exemplary embodiments of the present invention.

FIG. 13 shows a second example graphical user interface (GUI) as it relates to a scenario detection and conversation tag system, according to exemplary embodiments of the present invention. A default organization 1314 is able to use the GUI to train the scenario detection and conversation tag system. The left-side menu includes options for home 1302, analytics 1304, canvas 1306, coaching 1308, calibration 1310, and settings 1312. Organizational unit management 1316 includes options for users 1318, teams 1320, report sharing 1322, custom fields 1324, QA case assignment 1326, notification 1328, and audit logs 1330. Scripting engine 1332 includes options for scenarios 1334, conversation tags 1336, metric tags 1338, sentiment tags 1340, categories 1342, rubric builder 1344, and automation 1346. Knowledge center 1348 includes option FAQs 1350.

When scenarios 1334 is selected, the scenarios 1352 window allows the user to enter a scenario name, e.g., "greeting" 1354 for phrases associated with greetings. The GUI would indicate "no similar scenario found" 1358 if there are no existing scenarios similar to the one entered. The user then may select 1360 whom the scenario applies to, choosing among just the customer 1362, just the agent 1364, and both the agent and the customer 1366. The user is then prompted 1368 to enter a number (e.g., 5) of training sentences that should trigger the scenario. The entered phrases 1370 are then displayed, e.g., "thank you for calling us," with relevance 1372 percentages provided. The user may also provide 1380 training sentences that should not trigger the scenario.

The GUI indicates 1374 whether the entered scenario matches any of the accessible stored conversations. In the case shown, the "greeting" scenario matched 2,912 conversations out of 10,000 conversations. The most relevant (e.g., top 10) matches 1376 are shown, e.g., "thanks for calling in," "well, thanks for calling." A set of near misses 1378 are also displayed, e.g., "thank you so much for calling away."

Figure 14:
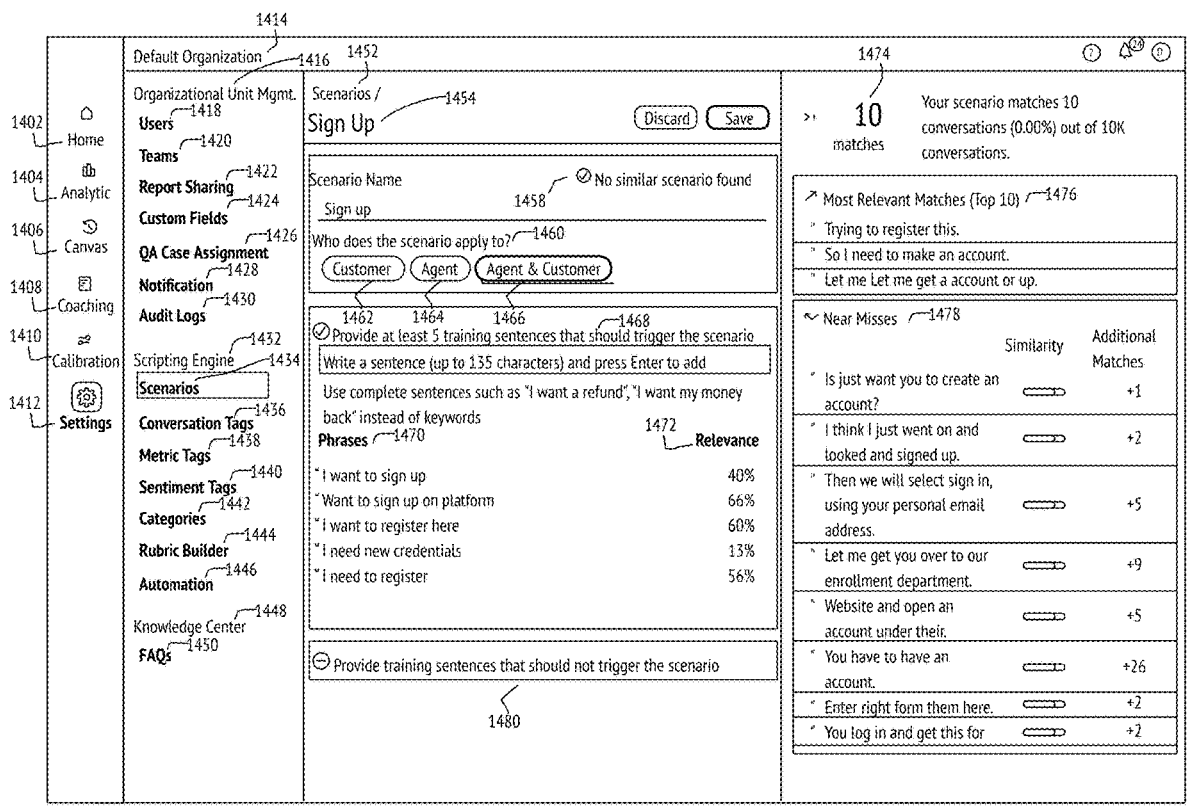
FIG. 14 shows a third example graphical user interface (GUI) as it relates to a scenario detection and conversation tag system, according to exemplary embodiments of the present invention.

FIG. 14 shows a third example graphical user interface (GUI) as it relates to a scenario detection and conversation tag system, according to exemplary embodiments of the present invention. A default organization 1414 is able to use the GUI to train the scenario detection and conversation tag system. The left-side menu includes options for home 1402, analytics 1404, canvas 1406, coaching 1408, calibration 1410, and settings 1412. Organizational unit management 1416 includes options for users 1418, teams 1420, report sharing 1422, custom fields 1424, QA case assignment 1426, notification 1428, and audit logs 1430. Scripting engine 1432 includes options for scenarios 1434, conversation tags 1436, metric tags 1438, sentiment tags 1440, categories 1442, rubric builder 1444, and automation 1446. Knowledge center 1448 includes option FAQs 1450.

When scenarios 1434 is selected, the scenarios 1452 window allows the user to enter a scenario name, e.g., "sign up" 1454 for phrases associated with signing up a new account with the organization. The GUI would indicate "no similar scenario found" 1458 if there are no existing scenarios similar to the one entered. The user then may select 1460 whom the scenario applies to, choosing among just the customer 1462, just the agent 1464, and both the agent and the customer 1466. The user is then prompted 1468 to enter a number (e.g., 5) of training sentences that should trigger the scenario. The entered phrases 1470 are then displayed, e.g., "I want to sign up," with relevance 1472 percentages provided. The user may also provide 1480 training sentences that should not trigger the scenario.

The GUI indicates 1474 whether the entered scenario matches any of the accessible stored conversations. In the case shown, the "sign up" scenario matched 10 conversations out of 10,000 conversations. The most relevant (e.g., top 10) matches 1476 are shown, e.g., "trying to register this," "so I need to make an account." A set of near misses 1478 are also displayed, e.g., "let me get you over to our enrollment department."

Figure 15:
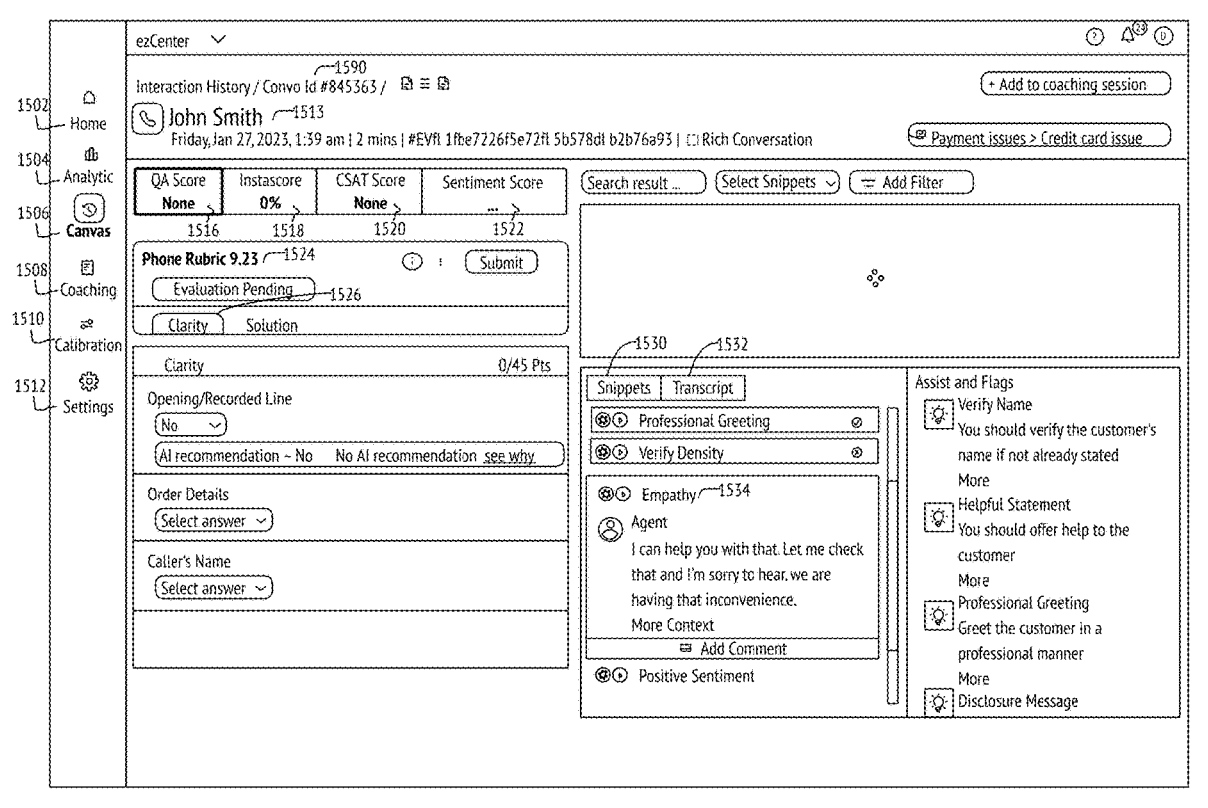

FIG. 15 shows a fourth example graphical user interface (GUI) as it relates to a scenario detection and conversation tag system, according to exemplary embodiments of the present invention. A default organization is able to use the GUI to view the call history and analytics for a selected customer or agent, e.g., John Smith 1513, as analyzed by the scenario detection and conversation tag system, as well as information and analytics for a particular conversation as indicated by a "convo ID" 1590. The left-side menu includes options for home 1502, analytics 1504, canvas 1506, coaching 1508, calibration 1510, and settings 1512. Various scores regarding the selected customer or agent, e.g., QA score 1516, Instascore 1518, CSAT score 1520, and sentiment score 1522. A phone rubric 1524 is provided.

The user is able to review snippets 1530 and a transcript 1532 of the particular conversation. For example, a particular snippet where the agent says "I can help you with that; let me check that, and I'm sorry to hear" may be tagged as the agent exhibiting "empathy" 1534.

Machine Learning (ML) and Neural Networks

Machine learning (ML) algorithms are characterized by the ability to improve their performance at a task over time without being explicitly programmed with the rules to perform that task (i.e., learn). A machine learning (ML) model is the output generated when a ML algorithm is trained on data. As described herein, embodiments of the present invention use one or more artificial intelligence (AI) and machine learning (ML) algorithms for scenario detection and conversation tag. Various exemplary ML algorithms are within the scope of the present invention. The following description describes illustrative ML techniques for implementing various embodiments of the present invention.

Neural Networks

Figure 16:
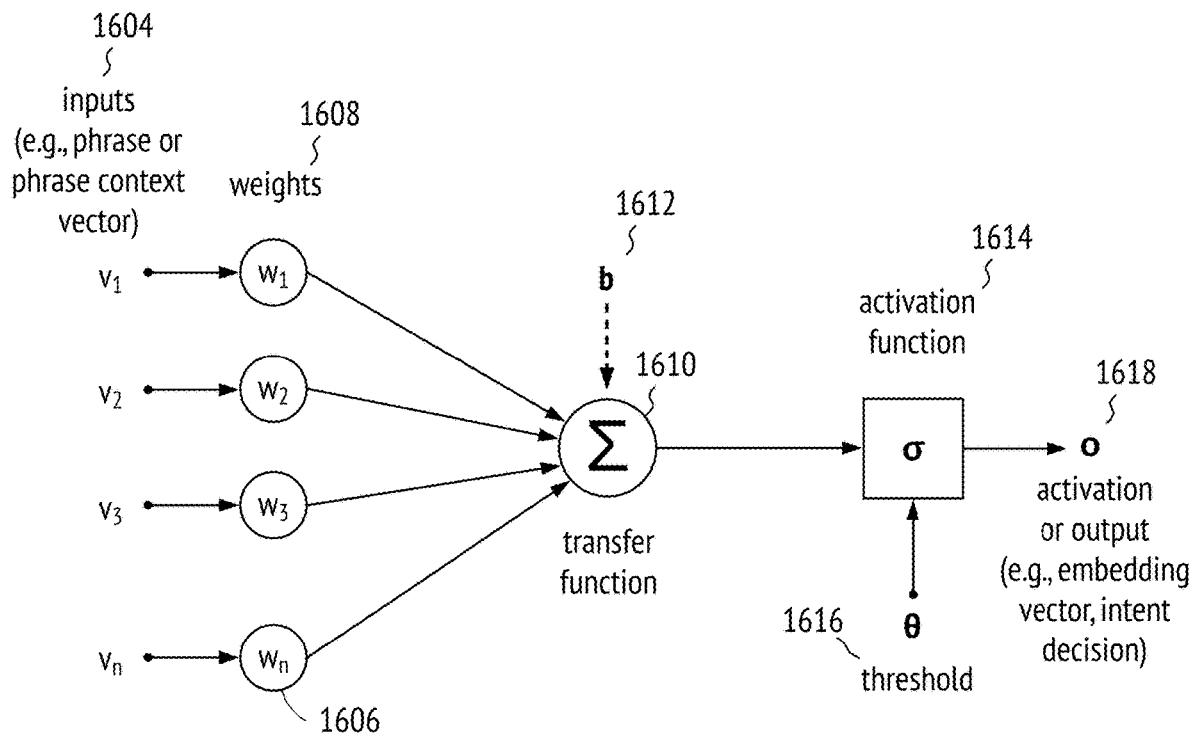
FIG. 16 describes fundamental neural network operation as it relates to a scenario detection and conversation tag system, according to exemplary embodiments of the present invention.

A neural network is a computational model inspired by the structure of the human brain, consisting of interconnected units called neurons that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 16 describes fundamental neural network operation as it relates to a scenario detection and conversation tag system, according to exemplary embodiments of the present invention.

FIG. 16 shows a single-layered neural network, also known as a single-layer perceptron. Such a perceptron is the building block for neural networking layers included in bi-encoder and cross-encoders, according to embodiments of the present invention. The operation of a single-layered neural network involves the following steps:

1. Input: Receiving an input vector v 1604 with elements $v_j$, with $j \in [1, n]$ representing the $j^{th}$ input, and where each element of the vector corresponds to a neuron 1606 in the input layer. In a scenario detection and conversation tag system, the input vector may be the letters, syllables, or words of a phrase, utterance, or sentence. The input vector may also be the elements of a phrase context vector or embedding vector, as described in the present disclosure.
2. Transfer Function: Multiplying each input by a corresponding weight $w_j$ 1608. These weighted inputs are then summed together as the transfer function, yielding the net input to the activation function $$\sum_{j=1}^{n} v_j \cdot w_j \ 1610.$$

Each neuron in a neural network may have a bias value 1612, which is added to the weighted sum of the inputs to that neuron. Both the weights and bias values are learned during the training process. The purpose of the bias is to provide every neuron with a trainable constant value that can help the model fit the data better. With biases, the net input to the activation function $$\sum_{j=1}^{n} \{v_j \cdot w_j\} + b.$$

3. Activation Function: Passing the net input through an activation function 1614. The activation function o determines the activation value o 1618, which is the output of the neuron. It is typically a non-linear function such as a sigmoid or ReLU (Rectified Linear Unit) function. The threshold θ 1616 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.
4. Output: The activation value o 1618 is the output of the activation function. This value is what gets passed on to the next layer in the network or becomes the final output in the case of the last layer. In a scenario detection and conversation tag system, the final output of the neural network may be an embedding or context vector representing a scenario phrase, or a scenario intent boolean variable.

Figure 17:
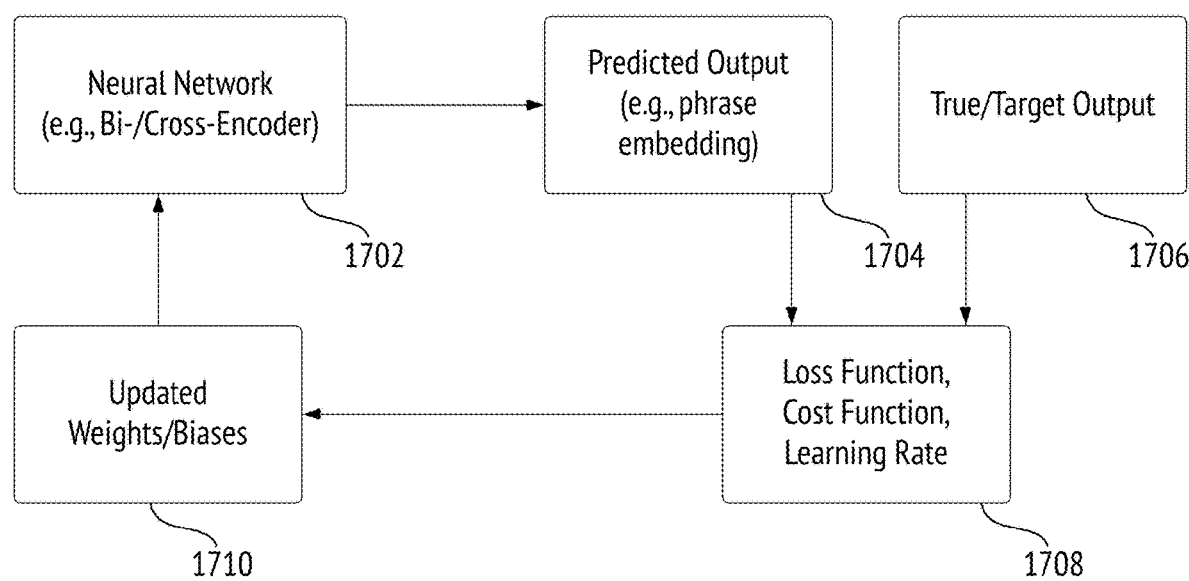
FIG. 17 shows an overview of the neural network training process that can be used in a scenario detection and conversation tag system, according to exemplary embodiments of the present invention.

FIG. 17 shows an overview of the neural network training process that can be used in a scenario detection and conversation tag system, according to exemplary embodiments of the present invention.

In a scenario detection and conversation tag system, the neural network 1702 undergoing the training may be a bi-encoder or a cross-encoder, as described in the present disclosure. The training of a neural network involves repeatedly updating the weights and biases 1710 of the network to minimize the difference between the predicted output 1704 and the true or target output 1706, where the predicted output 1704 is the result produced by the network when a set of inputs from a dataset is passed through it. The true or target output 1706 is the true desired result. The difference between the predicted output and the true output is calculated using a loss function 1708, which quantifies the error made by the network in its predictions. In a scenario detection and conversation tag system, the predicted 1704 and true/target outputs 1706 of the neural network may be an embedding or context vector representing a scenario phrase, or a scenario intent boolean variable.

The loss function is a part of the cost function 1708, which is a measure of how well the network is performing over the whole dataset. The goal of training is to minimize the cost function 1708. This is achieved by iteratively adjusting the weights and biases 1710 of the network in the direction that leads to the steepest descent in the cost function. The size of these adjustments is determined by the learning rate 1708, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 1710 of the network based on the error (e.g., cost function) 1708 of the output. After forward propagation through neural network 1702, the output 1704 of the network is compared with true output 1706, and the error 1708 is calculated. This error is then propagated back through the network, starting from the output layer and moving towards the input layer. The weights and biases 1710 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

Figure 18:
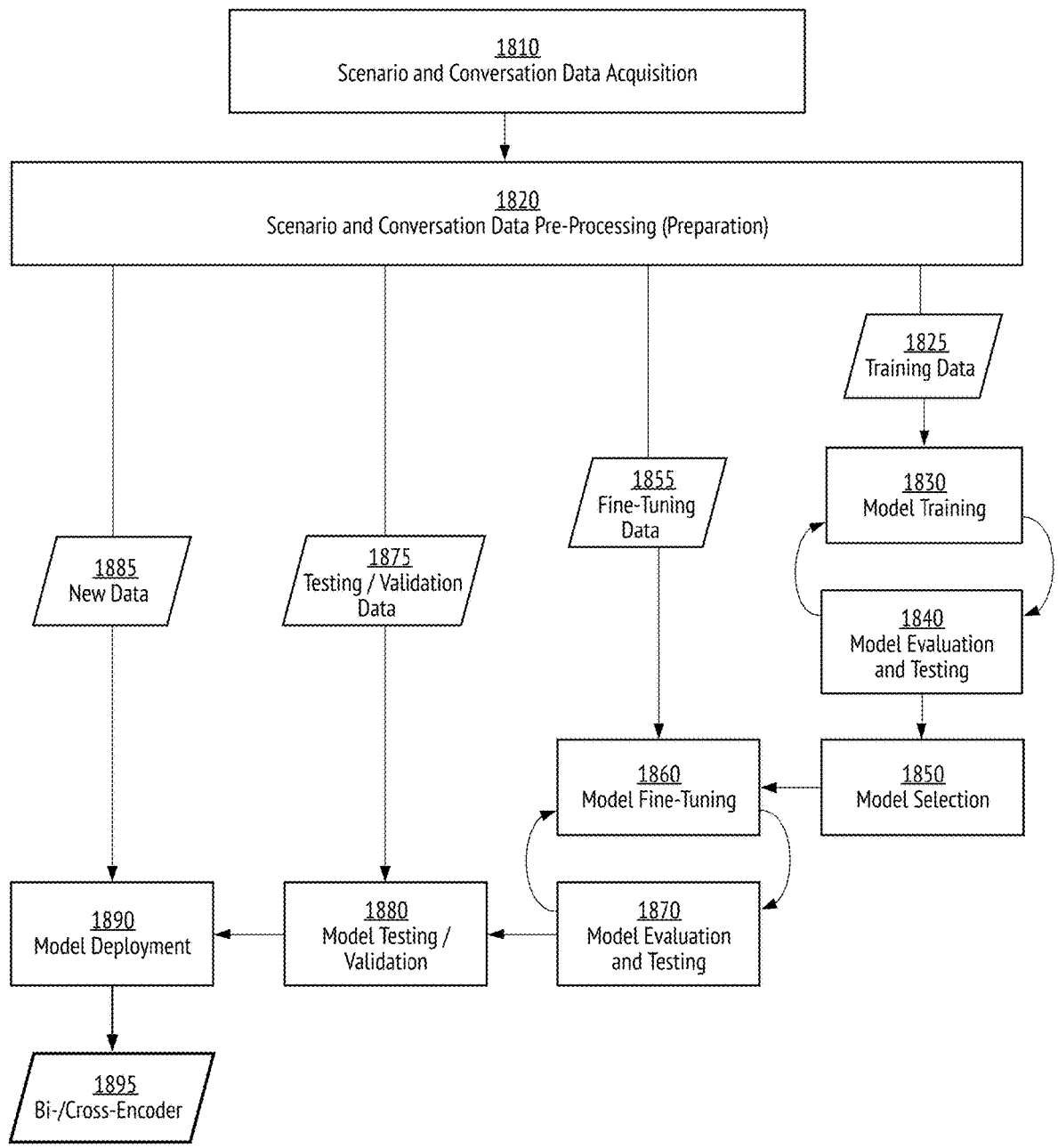
FIG. 18 is an illustrative flow diagram showing the different phases and datasets involved in training a machine learning algorithm for a scenario detection and conversation tag system, according to exemplary embodiments of the present invention.

FIG. 18 provides additional details on the training process, according to exemplary embodiments of the present invention.

Transformer Model Architecture

The transformer architecture, as used by the bi-encoder and cross-encoder described in FIGS. 4-7, is a neural network design that was introduced in the paper "*Attention is All You Need*" by Vaswani et al. (available at arxiv.org/abs/1706.03762) published in June 2017, and incorporated herein by reference as if fully set forth herein. Large Language Models (LLMs) heavily rely on the transformer architecture.

The architecture (see FIG. 1 of the referenced paper) is based on the concept of "attention," allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens." This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding," transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding." Therefore, the training of a neural network and its evaluation (i.e., its use upon deployment) both occur within the embeddings space.

In the remainder of this document, the processes of tokenization, encoding, decoding, and detokenization are assumed. In other words, the processes described below occur in the "embeddings space." Hence, while the tokenization and encoding of training data and input prompts may not be represented or discussed explicitly, they are implied. Similarly, the decoding and detokenization of neural network outputs is also implied.

Training and Fine-Tuning Machine Learning (ML) Modules

FIG. 18 is an illustrative flow diagram showing the different phases and datasets involved in training a machine learning algorithm for a scenario detection and conversation tag system, according to exemplary embodiments of the present invention.

The training process begins at step 1810 with the acquisition, retrieval, assimilation, or generation of scenario and conversation data. At step 1820, acquired data are preprocessed, or prepared. At step 1830, the ML model (e.g., bi-encoder or cross-encoder) is trained using training data 1825. At step 1840, the ML model is evaluated, validated, and tested, and further refinements to the ML model are fed back into step 1830 for additional training. Once its performance is acceptable, at step 1850, optimal model parameters are selected.

Training data 1825 is a documented data set containing multiple instances of system inputs and correct outcomes. It trains the ML model to optimize the performance for a specific target task. In FIG. 18, training data 1825 may also include subsets for validating and testing the ML model, as part of the training iterations 1830 and 1840. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 2825 may be expanded via an augmentation process.

In some embodiments, an additional fine-tuning 1860 phase including iterative fine-tuning 1860 and evaluation, validation, and testing 1870 steps, is carried out using fine-tuning data 1855. Fine-tuning in machine learning is a process that involves taking a selected 1850 pre-trained model and further adjusting or "tuning" its parameters to better suit a specific task or fine-tuning dataset 1855. This technique is particularly useful when dealing with deep learning models that have been trained on large, general training datasets 1825 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 1825, such as ImageNet for image recognition tasks. The model's existing weights, which have been learned from the original training, serve as the starting point. During fine-tuning, the model is trained further on a new fine-tuning dataset 1855, which may contain different classes or types of data than the original training set. This additional training phase allows the model to adjust its weights to better capture the characteristics of the new fine-tuning dataset 1855, thereby improving its performance on the specific task it is being fine-tuned for.

In some embodiments, additional test and validation 1880 phases are carried out using test and validation data 1875. Testing and validation of a ML model both refer to the process of evaluating the model's performance on a separate dataset 1875 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the model is trained 1830, selected 1850, and optionally fine-tuned 1860 and validated/tested 1880, it is deployed 1890. Deployed ML models such as the bi-encoder and cross-encoder 1895 usually receive new data 1885 that was pre-processed 1820.

In machine learning, data pre-processing 1820 is tailored to the phase of model development. During model training 1830, pre-processing involves cleaning, normalizing, and transforming raw data into a format suitable for learning patterns. For fine-tuning 1860, pre-processing adapts the data to align with the distribution of the specific targeted task, ensuring the pre-trained model can effectively transfer its knowledge. Validation 1880 pre-processing mirrors that of training to accurately assess model generalization without leakage of information from the training set. Finally, in deployment (1890 and 1895), pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models—A Transformative Reading List*," by S. Raschka (posted Feb. 7, 2023, available at sebastianraschka.com/blog/2023/llm-reading-list.html), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances and output instances, or may be generated synthetically by subject matter experts.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be in direct or indirect communication with, for example, one another over the same or different wired or wireless networks.

Figure 19:
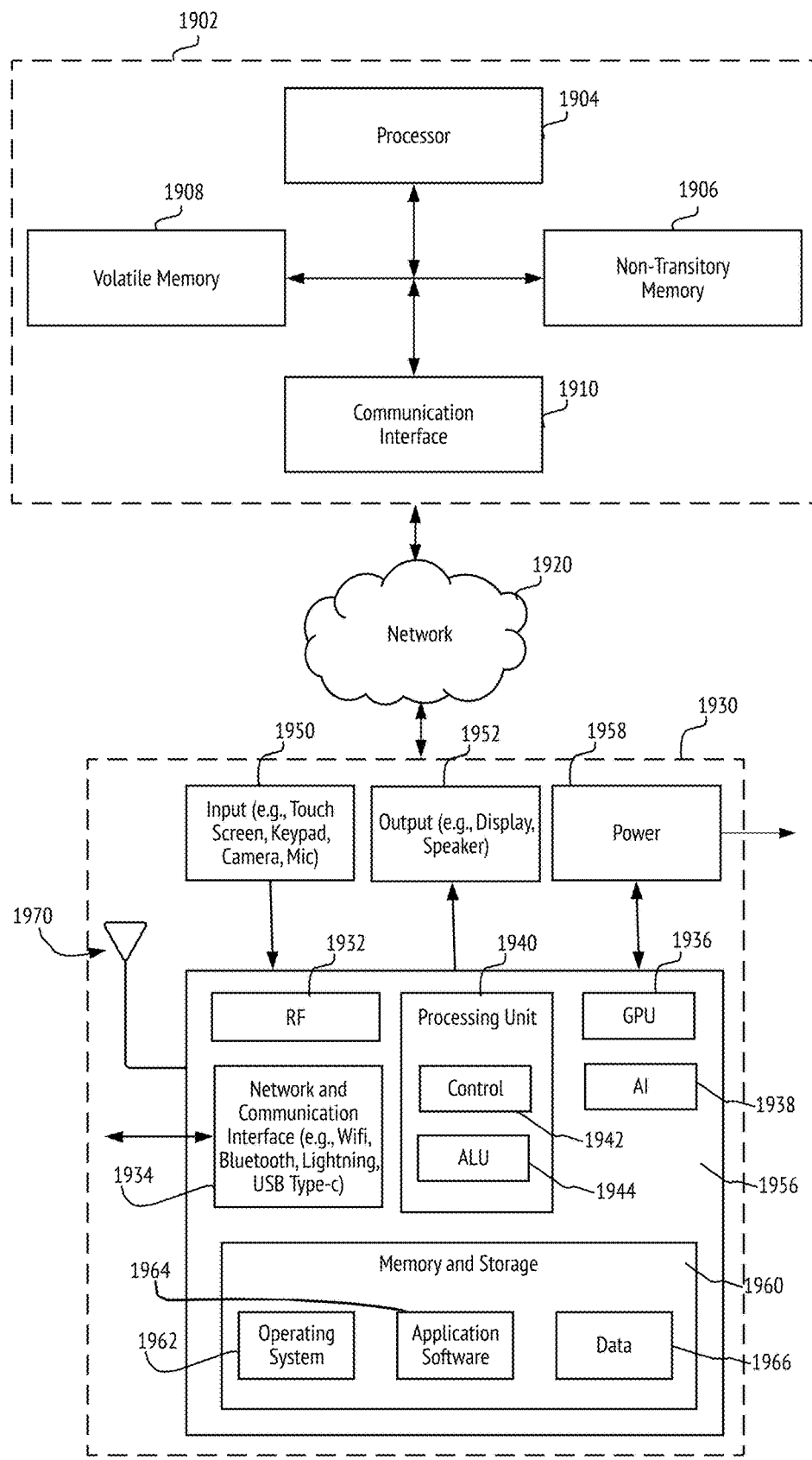
FIG. 19 provides illustrative schematics of a server (management computing entity) and a client (user computing entity) used for a scenario detection and conversation tag system, according to some embodiments of the present invention.

FIG. 19 provides illustrative schematics of a server (management computing entity) 1902 connected via a network 1920 to a client (user computing entity) 1930 used for communication within a scenario detection and conversation tag system, according to some embodiments of the present invention. While FIG. 19 illustrates the various system entities as separate, standalone entities, the various embodiments are not limited to this particular architecture. Additionally, the terms "client device," "client computing entity," "edge device," and "edge computing system" are equivalent and are used interchangeably herein.

Exemplary Management Computing Entity

FIG. 19 provides a schematic of a server (management computing entity, 1902) according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (1902) may also include one or more communications interfaces (1910) for communicating with various computing entities, such as by communicating data, content, and/or information (similar terms used herein interchangeably) that can be transmitted, received, operated on, processed, displayed, stored, and/or the like.

As shown in FIG. 19, in one embodiment, the management computing entity (1902) may include or be in communication with one or more processors (i.e., processing elements, 1904, also referred to as processors and/or processing circuitry, and similar terms used herein interchangeably) that communicate with other elements within the management computing entity (1902) via a bus, for example. As will be understood, the processor (1904) may be embodied in a number of different ways. For example, the processor (1904) may be embodied as one or more complex programmable logic devices (CPLDs), microprocessors, multi-core processors, co-processing entities, application-specific instruction-set processors (ASIPs), microcontrollers, and/or controllers. Further, the processor (1904) may be embodied as one or more other processing devices or circuitry. The term circuitry may refer to an entire hardware embodiment or a combination of hardware and computer program products. Thus, the processor (1904) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (1904) may be configured for a particular use or configured to execute instructions stored in volatile or non-volatile (or non-transitory) media or otherwise accessible to the processor (1904). As such, whether configured by hardware or computer program products, or by a combination thereof, the processor (1904) may be capable of performing steps or operations according to embodiments of the present disclosure when configured accordingly.

In one embodiment, the management computing entity (1902) may further include or be in communication with non-transitory memory (also referred to as non-volatile media, non-volatile storage, non-transitory storage, memory, memory storage, and/or memory circuitry-similar terms used herein interchangeably). In one embodiment, the non-transitory memory or storage may include one or more non-transitory memory or storage media (1906), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity (1902) may further include or be in communication with volatile media (also referred to as volatile storage, memory, memory storage, memory and/or circuitry-similar terms used herein interchangeably). In one embodiment, the volatile storage or memory may also include one or more volatile storage or memory media 1908, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (1904). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (1902) with the assistance of the processor (1904) and operating system.

As indicated, in one embodiment, the management computing entity (1902) may also include one or more communications interfaces (1910) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (1902) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity (1902) may include or be in communication with one or more input elements, such as a keyboard input, a mouse input, a touch screen/display input, motion input, movement input, audio input, pointing device input, joystick input, keypad input, and/or the like. The management computing entity (1902) may also include or be in communication with one or more output elements (not shown), such as audio output, video output, screen/display output, motion output, movement output, and/or the like.

As will be appreciated, one or more of the components of the management computing entity (1902) may be located remotely from other management computing entity (1902) components, such as in a distributed system. Furthermore, one or more of the components may be combined and additional components performing functions described herein may be included in the management computing entity (1902). Thus, the management computing entity (1902) can be adapted to accommodate a variety of needs and circumstances. As will be recognized, these architectures and descriptions are provided for exemplary purposes only and are not limited to the various embodiments.

Exemplary User Computing Entity

A user may be a human individual, a company, an organization, an entity, a department within an organization, a representative of an organization and/or person, an artificial users such as algorithms, artificial intelligence, or other software that interfaces, and/or the like. FIG. 19 further provides an illustrative schematic representation of a client user computing entity 1930 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities can be operated by various parties. Such functions, operations, and/or processes may include, for example, transmitting, receiving, retrieving, operating on, crawling, extracting, processing, displaying, storing, determining, creating, generating, generating for display, monitoring, evaluating, comparing, and/or similar terms used herein interchangeably. In various embodiments, these functions, operations, and/or processes can be performed on machine-readable or human-readable data, content, information, and/or similar terms used herein interchangeably. Furthermore, in embodiments of the present invention, computing device 1930 may be a general-purpose computing device with dedicated graphical processing unit (GPU) 1936 and artificial intelligence 1938 modules. In some embodiments, computing device 1930 may be built over a backplane 1956 connected to a power source 1958. It may alternatively be implemented in the cloud, with logically and/or physically distributed architectures.

As shown in FIG. 19, user computing entity 1930 may include an antenna 1970, a radio frequency (RF) transceiver 1932, and a processor unit 1940 that provides signals to and receives signals from the transceiver. The signals provided to and received from the transceiver may include signaling information in accordance with air interface standards of applicable wireless systems. In this regard, the user computing entity (1930) may be capable of operating with one or more air interface standards, communication protocols, modulation types, and access types. More particularly, user computing entity 1930 may operate in accordance with any of a number of wireless communication standards and protocols, such as those described above with regard to management computing entity 1902. In a particular embodiment, user computing entity 1930 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, user computing entity 1930 may operate in accordance with multiple wired communication standards and protocols, such as those described above with regard to management computing entity 1902, via its own network and communications interface 1934.

Via these communication standards and protocols, user computing entity 1930 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 1930 can also download changes, add-ons, and updates, for instance, to its firmware, software (e.g., including executable instructions, applications, program modules), and operating system.

In some implementations, processing unit 1940 may be embodied in several different ways. For example, processing unit 1940 may be embodied as one or more complex programmable logic devices (CPLDs), microprocessors, multi-core processors, co-processing entities, application-specific instruction-set processors (ASIPs), microcontrollers, and/or controllers. Further, processing unit 1940 may be embodied as one or more other processing devices or circuitry. The term circuitry may refer to an entirely hardware embodiment or a combination of hardware and computer program products. Thus, processing unit 1940 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1940 may be configured for a particular use or configured to execute instructions stored in volatile or non-volatile media or otherwise accessible to the processing unit. As such, whether configured by hardware or computer program products, or by a combination thereof, processing unit 1940 may be capable of performing steps or operations according to embodiments of the present invention when configured accordingly.

In some embodiments, processing unit 1940 may comprise a control unit 1942 and a dedicated arithmetic logic unit (ALU) 1944 to perform arithmetic and logic operations. In some embodiments, user computing entity 1930 may comprise a graphics processing unit (GPU) 1946 for specialized parallel processing tasks, and/or an artificial intelligence (AI) module or accelerator 1948, also specialized for applications including artificial neural networks and machine learning. In some embodiments, processing unit 1940 may be coupled with GPU 1946 and/or AI accelerator 1948 to distribute and coordinate processing tasks.

In some embodiments, computing entity 1930 may include a user interface, comprising an input interface 1950 and an output interface 1952, each coupled to processing unit 1940. User input interface 1950 may comprise any of a number of devices or interfaces allowing computing entity 1930 to receive data, such as a keypad (hard or soft), a touch display, a mic for voice/speech, and a camera for motion or posture interfaces. User output interface 1952 may comprise any of a number of devices or interfaces allowing computing entity 1930 to provide information to a user, such as through the touch display, or a speaker for audio outputs. In some embodiments, output interface 1952 may connect computing entity 1930 to an external loudspeaker or projector, for audio or visual output. In some embodiments, user interfaces 1950 and 1952 integrate multimodal data, and cater to both humans and bots/algorithms. Some examples of human interfaces include a dashboard-style interface, a workflow-based interface, conversational interfaces, and spatial-computer interfaces. Some examples of bot/algorithmic interfaces include code interfaces, text-based API interfaces, and the like.

User computing entity 1930 can also include volatile and/or non-volatile storage or memory 1960, which can be embedded and/or may be removable. For example, the non-volatile or non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store an operating system 1962, application software 1964, data 1966, databases, database instances, database management systems, data, applications, programs, program modules, scripts, source code, object code, byte code, compiled code, interpreted code, machine code, executable instructions, and/or the like to implement the functions of the user computing entity (1930). As indicated, this may include a user application that is resident on the entity or accessible through a browser or other user interface for communicating with the management computing entity (1902) and/or various other computing entities.

In some embodiments, user computing entity 1930 may include one or more components or functionality that are the same or similar to those of management computing entity 1902, as described in greater detail above. As will be recognized, these architectures and descriptions are provided for exemplary purposes only and are not limited to the various embodiments.

In some embodiments, computing entities 1910 and/or 1930 may communicate to external devices like other computing devices and/or access points to receive information such as software or firmware, or to send information from the memory of the computing entity to external systems or devices such as servers, computers, smartphones, and the like.

In some embodiments, two or more computing entities such as 1910 and/or 1930 may establish connections using a network such as 1920 utilizing any of the networking protocols listed previously. In some embodiments, the computing entities may use network interfaces such as 1910 and 1934 to communicate with each other, such as by communicating data, content, information, and/or similar terms used herein interchangeably that can be transmitted, received, operated on, processed, displayed, stored, and/or the like.

In some embodiments of the present invention, the entire system may be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like. The terms "comprise," "comprising," "includes," "including," "have," "having," and the like, used in the specification and claims is meant to be open-ended and not restrictive, meaning "including but not limited to."

In the foregoing description, numerous specific details are set forth, such as specific structures, dimensions, processes parameters, etc., to provide a thorough understanding of the present invention. The particular features, structures, materials, or characteristics may be combined in any suitable manner in one or more embodiments. The words "example," "exemplary," "illustrative" and the like, are used herein to mean serving as an example, instance, or illustration. Any aspect or design described herein as "example" or equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or." That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number +/−10%, such that "about 10" would include from 9 to 11. In other exemplary embodiments, the term "about" may include the recited number +/−X %, where X is considered the normal variation in said measurement by one of ordinary skill in the art.

Features that are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. Features of the transitory physical storage medium described may be incorporated into/used in a corresponding method and/or system, and vice versa.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, as defined by the claims.

What is claimed is:

1. A non-transitory physical storage medium storing program code, the program code executable by a hardware processor, the hardware processor when executing the program code causing the hardware processor to execute a computer-implemented process for determining a best-matched scenario name label for an utterance during automatic scenario detection in customer-agent conversations, the program code comprising code to:
receive by a retrieve stage, the retrieve stage comprising a bi-encoder neural network, a plurality of scenarios, a plurality of scenario name labels, and a plurality of lists of sample phrases, wherein each scenario in the plurality of scenarios is associated with a scenario name label in the plurality of scenario name labels and with a list of sample phrases in the plurality of lists of sample phrases, and wherein the bi-encoder neural network comprises a Masked and Permuted Pre-training for Language Understanding (MPNet)-based model, a pooling operation, a cosine similarity operation, a plurality of encoder stacks, and a multilayer perceptron (MLP);
encode, by the retrieve stage, each sample phrase in the plurality of lists of sample phrases into a phrase encoding to generate a plurality of lists of phrase encodings;
generate, by the retrieve stage, a plurality of scenario encodings, wherein each scenario encoding in the plurality of scenario encodings is associated with a scenario in the plurality of scenarios, is associated with a scenario name label in the plurality of scenario name labels, and is associated with a list of phrase encodings in the plurality of lists of phrase encodings, and wherein each scenario encoding in the plurality of scenario encodings is based on normalizing and determining a centroid of a list of phrase encodings associated with the scenario in the plurality of scenarios;

store the plurality of scenario encodings, the plurality of scenario name labels, and the plurality of lists of phrase encodings into a database;

receive, by the retrieve stage, the utterance;

encode, by the retrieve stage, a conversation context vector of the utterance;

generate, by the retrieve stage, a plurality of similarity scores for the conversation context vector of the utterance, wherein each similarity score in the plurality of similarity scores is associated with a given scenario encoding in the plurality of scenario encodings stored in the database;

determine, by the retrieve stage, a best-matched scenario encoding from among the plurality of scenario encodings by selecting a given scenario encoding in the plurality of scenarios with a highest similarity score among the plurality of similarity scores;

generate, by the retrieve stage, a plurality of ordered pairs, wherein a first component of each ordered pair in the plurality of ordered pairs is the utterance and a second component of each ordered pair in the plurality of ordered pairs is a given phrase encoding from a given list of phrase encodings associated with the best-matched scenario encoding;

generate by a rerank stage, the rerank stage comprising a cross-encoder neural network, a plurality of probabilities of similarity, wherein each probability of similarity in the plurality of probabilities of similarity is associated with an ordered pair in the plurality of ordered pairs, wherein the cross-encoder neural network comprises a linear layer configured to accept CLS (classification) token embeddings, a sigmoid operator, a large language model (LLM) based on a Bidirectional Encoder Representations from Transformers (BERT) language model configured to accept sentences, a classification head, a plurality of encoder stacks, and a multilayer perceptron (MLP);

determine, by the rerank stage, whether at least one probability of similarity in the plurality of probabilities of similarity exceeds the preset threshold;

assign, by the rerank stage, the best-matched scenario name label from among the plurality of scenario name labels associated with the best-matched scenario encoding to the utterance if at least one probability of similarity in the plurality of probabilities of similarity exceeds a preset threshold; and assign, by the rerank stage, an intentless scenario name label to the utterance if no probability of similarity in the plurality of probabilities of similarity exceeds the preset threshold.

2. The non-transitory physical storage medium of claim 1, wherein the bi-encoder neural network further comprises input encoding, output encodings of shape, a layernorm, and a multi-head attention.

3. The non-transitory physical storage medium of claim 1, wherein the cross-encoder neural network further comprises input encoding, output encodings of shape, a layernorm, and a multi-head attention.

4. The non-transitory physical storage medium of claim 1, wherein the encoding a sample phrase comprises generating a vector of real numbers.

5. The non-transitory physical storage medium of claim 1, wherein the plurality of similarity scores comprises a plurality of cosine similarity scores.

6. The non-transitory physical storage medium of claim 1, wherein the program code further comprises code to:
trigger a conversation tag based on the best-matched scenario name label and a plurality of configured options, wherein the conversation tag comprises a text string.

7. The non-transitory physical storage medium of claim 6, wherein the plurality of configured options comprises a speaker identity, and wherein the program code to trigger the conversation tag is further based on an identity of a speaker of the utterance.

8. The non-transitory physical storage medium of claim 7, wherein the program code to trigger the conversation tag is further based on whether a sequence of an agent sentence is followed by a customer sentence.

9. The non-transitory physical storage medium of claim 6, wherein the plurality of configured options comprises a speaker behavior, and wherein the program code to trigger the conversation tag is further based on whether a speaker of the utterance mentioned a particular phrase.

10. The non-transitory physical storage medium of claim 6, wherein the plurality of configured options comprises a timing, wherein the program code to trigger the conversation tag is further based on whether the utterance occurred within a preset period of time after a conversation has begun.

11. A non-transitory physical storage medium storing program code, the program code executable by a hardware processor, the hardware processor when executing the program code causing the hardware processor to execute a computer-implemented process for determining a best-matched scenario name label for an utterance during automatic scenario detection in customer-agent conversations, the program code comprising code to:

receive by a retrieve stage the utterance, the retrieve stage comprising a bi-encoder neural network, wherein the bi-encoder neural network comprises a Masked and Permuted Pre-training for Language Understanding (MPNet)-based model, a pooling operation, a cosine similarity operation, a plurality of encoder stacks, and a multilayer perceptron (MLP);

encode, by the retrieve stage, a conversation context vector of the utterance;

generate, by the retrieve stage, a plurality of similarity scores for the conversation context vector of the utterance, wherein each similarity score in the plurality of similarity scores is associated with a scenario encoding in a plurality of scenario encodings, is associated with a scenario name label in a plurality of scenario name labels, and is associated with a list of phrase encodings in a plurality of lists of phrase encodings;

determine, by the retrieve stage, a best-matched scenario encoding from among the plurality of scenario encodings by selecting a given scenario encoding in the plurality of scenario encodings with a highest similarity score among the plurality of similarity scores;

generate, by the retrieve stage, a plurality of ordered pairs, wherein a first component of each ordered pair in the plurality of ordered pairs is the utterance and a second component of each ordered pair in the plurality of ordered pairs is a given phrase encoding from a given list of phrase encodings associated with the best-matched scenario encoding;

generate by a rerank stage, the rerank stage comprising a cross-encoder neural network, a plurality of probabilities of similarity, wherein each probability of similarity in the plurality of probabilities of similarity is associated with an ordered pair in the plurality of ordered pairs, and wherein the cross-encoder neural network comprises a linear layer configured to accept CLS (classification) token embeddings, a sigmoid operator, a large language model (LLM) based on a Bidirectional Encoder Representations from Transformers (BERT) language model configured to accept sentences, a classification head, a plurality of encoder stacks, and a multilayer perceptron (MLP);

determine, by the rerank stage, whether at least one probability of similarity in the plurality of probabilities of similarity exceeds a preset threshold;

assign, by the rerank stage, the best-matched scenario name label from among the plurality of scenario name labels associated with the best-matched scenario encoding to the utterance if at least one probability of similarity in the plurality of probabilities of similarity exceeds the preset threshold; and assign, by the rerank stage, an intentless scenario name label to the utterance if no probability of similarity in the plurality of probabilities of similarity exceeds the preset threshold.

12. A computer-implemented method for determining a best-matched scenario name label for an utterance during automatic scenario detection in customer-agent conversations, the method comprising:

receiving by a retrieve stage the utterance, the retrieve stage comprising a bi-encoder neural network, wherein the bi-encoder neural network comprises a Masked and Permuted Pre-training for Language Understanding (MPNet)-based model, a pooling operation, a cosine similarity operation, a plurality of encoder stacks, and a multilayer perceptron (MLP);

encoding, by the retrieve stage, a conversation context vector of the utterance;

generating, by the retrieve stage, a plurality of similarity scores for the conversation context vector of the utterance, wherein each similarity score in the plurality of similarity scores is associated with a scenario encoding in a plurality of scenario encodings, is associated with a scenario name label in a plurality of scenario name labels, and is associated with a list of phrase encodings in a plurality of lists of phrase encodings;

determining, by the retrieve stage, a best-matched scenario encoding from among the plurality of scenario encodings by selecting a given scenario encoding in the plurality of scenario encodings with a highest similarity score among the plurality of similarity scores;

generating, by the retrieve stage, a plurality of ordered pairs, wherein a first component of each ordered pair in the plurality of ordered pairs is the utterance and a second component of each ordered pair in the plurality of ordered pairs is a given phrase encoding from a given list of phrase encodings associated with the best-matched scenario encoding;

generating by a rerank stage, the rerank stage comprising a cross-encoder neural network, a plurality of probabilities of similarity, wherein each probability of similarity in the plurality of probabilities of similarity is associated with an ordered pair in the plurality of ordered pairs, and wherein the cross-encoder neural network comprises a linear layer configured to accept CLS (classification) token embeddings, a sigmoid operator, a large language model (LLM) based on a Bidirectional Encoder Representations from Transformers (BERT) language model configured to accept sentences, a classification head, a plurality of encoder stacks, and a multilayer perceptron (MLP);

determining, by the rerank stage, whether at least one probability of similarity in the plurality of probabilities of similarity exceeds a preset threshold;

assigning, by the rerank stage, the best-matched scenario name label from among the plurality of scenario name labels associated with the best-matched scenario encoding to the utterance if at least one probability of similarity in the plurality of probabilities of similarity exceeds the preset threshold; and assigning, by the rerank stage, an intentless scenario name label to the utterance if no probability of similarity in the plurality of probabilities of similarity exceeds the preset threshold.

13. The computer-implemented method of claim 12, wherein the bi-encoder neural network further comprises input encoding, output encodings of shape, a layernorm, and a multi-head attention.

14. The computer-implemented method of claim 12, wherein the cross-encoder neural network further comprises input encoding, output encodings of shape, a layernorm, and a multi-head attention.

15. The computer-implemented method of claim 12, wherein the plurality of similarity scores comprises a plurality of cosine similarity scores.

16. The computer-implemented method of claim 12, further comprising: triggering a conversation tag based on the best-matched scenario name label and a plurality of configured options, wherein the conversation tag comprises a text string.

17. The computer-implemented method of claim 16, wherein the plurality of configured options comprises a speaker identity, and wherein the triggering the conversation tag is further based on an identity of a speaker of the utterance and on whether a sequence of an agent sentence is followed by a customer sentence.

18. The computer-implemented method of claim 16, wherein the plurality of configured options comprises a speaker behavior, and wherein the triggering the conversation tag is further based on whether a speaker of the utterance mentioned a particular phrase.

19. The computer-implemented method of claim 16, wherein the plurality of configured options comprises a timing, and wherein the triggering the conversation tag is further based on whether the utterance occurred within a preset period of time after a conversation has begun.

* * * * *